United States Patent [19]

Yamanashi

[11] Patent Number: 4,822,152
[45] Date of Patent: Apr. 18, 1989

[54] COMPACT HIGH-VARI-FOCAL RATIO ZOOM LENS SYSTEM

[75] Inventor: Takanori Yamanashi, Tokyo, Japan
[73] Assignee: Olympus Optical Co., Ltd., Tokyo, Japan
[21] Appl. No.: 084,095
[22] Filed: Aug. 11, 1987

[30] Foreign Application Priority Data

Aug. 11, 1986 [JP] Japan ............................. 61-186727
Dec. 22, 1986 [JP] Japan ............................. 61-303876

[51] Int. Cl.⁴ .......................... G02B 15/14; G02B 9/64
[52] U.S. Cl. ........................................ 350/427; 350/423
[58] Field of Search ................................ 350/427, 423

[56] References Cited

U.S. PATENT DOCUMENTS 4,666,257 5/1987 Tanaka et al. .................. 350/427

FOREIGN PATENT DOCUMENTS 56-128911 10/1981 Japan .
57-201213 12/1982 Japan .
58-137813 8/1983 Japan .
60-55314 3/1985 Japan .
60-57814 4/1985 Japan .

Primary Examiner—John K. Corbin
Assistant Examiner—Rebecca D. Gass
Attorney, Agent, or Firm—Cushman, Darby & Cushman

[57] ABSTRACT

A compact high vari-focal ratio zoom lens system comprising a first lens group having positive refractive power, a second lens group having negative refractive power, a third lens group having positive refractive power, and a fourth lens group having negative refractive power, in the order from the object side, and arranged to move respective lens groups toward the object side at the time of zooming from the wide position to the teleposition, the compact high vari-focal ratio zoom lens system being arranged to adequately distribute the refractive power to respective lens groups and thereby arranged to have a high vari-focal ratio, to be small in sized and to have favorable performance.

17 Claims, 13 Drawing Sheets

COMPACT HIGH-VARI-FOCAL RATIO ZOOM LENS SYSTEM

BACKGROUND OF THE INVENTION (a) Field of the Invention

The present invention relates to a compact high vari-focal ratio zoom lens system and, more particularly, to a compact high vari-focal ratio zoom lens system which comprises four lens groups and which is suitable for a camera with a lens shutter.

(b) Description of the Prior Art

In recent years, due to the fact that full automatization of cameras is being promoted, there is a tendency that variable focal length lens systems are adopted also as photographic lens systems for so-called cameras with lens shutters which are characterized by portability and, consequently, it is required to develop a compact zoom lens system.

A lens system, which is to be used chiefly with a camera with a lens shutter as mentioned in the above, is not subject to a restriction given to lens systems for single-lens reflex cameras, i.e., a restriction to ensure a particular back focal length, and it is therefore possible to make the lens system compact by making the back focal length short.

To make a lens system compact by making the back focal length thereof short as mentioned in the above, it is theoretically known that it is effective when the lens system is arranged to comprise two lens groups to which refractive power is distributed in such manner as a positive lens group and a negative lens group in the order from the object side. For lens systems to be used with a camera with a lens shutter, it is proposed to make the lens system compact by arranging, for example, that a semi-wide angle fixed focal length lens system or a variable focal length lens system of focal length change-over type with two different focal lengths comprises two lens groups with the above-mentioned distribution of refractive power.

Besides, in the field of zoom lens systems, zoom lens systems arranged as described below are already proposed, i.e., a zoom lens system comprising two lens groups with the above-mentioned distribution of refractive power, a zoom lens system comprising three lens groups arranged by developing the above-mentioned zoom lens system comprising two lens groups and, furthermore, a zoom lens system comprising four lens groups arranged so as to attain improved performance, and those known zoom lens systems are actually used with cameras with lens shutters.

However, the above-mentioned known zoom lens systems have a disadvantage that the vari-focal ratio thereof is about 1.5 only and, therefore, they are unsatisfactory from the view point of variation of the field angle. In other words, said known zoom lens systems do not fulfill the requirement of users in general who want to take photographs with variation of perspective. This means that, it is required to increase the vari-focal ratio at least to about 2 or to make it higher than 2. Besides, users of cameras with lens shutters are dissatisfied with the optical performance of lens systems thereof and, therefore, it is necessary to improve the optical peformance.

The zoom lens system disclosed by Japanese Published unexamined patent application No. 128911/81 is known as a typical type of the above-mentioned kind of know zoom lens systems. Said known zoom lens system comprises two lens groups, i.e., a first lens group having positive refractive power and a second lens group having negative refractive power, in the order from the object side and, at the time of zooming, said lens groups are moved as shown in FIG. 1.

Said type of known zoom lens system has such character that it has a telephoto type lens composition in the wide position (W), the principal point is put toward the object side and, therefore, the back focal length is short.

The zoom lens system disclosed by Japanese published unexamined patent application No. 201213/82 is also known as a zoom lens system comprising two lens groups, i.e., a positive lens group and a negative lens group, in the same way as above.

Even in case of the above-mentioned kind of zoom lens systems, it is possible to obtain a compact zoom lens system comprising a small number of lenses as far as the vari-focal ratio is about 1.5. However, when it is attempted to obtain a zoom lens system with a vari-focal ratio about 2, the amount of movement of the second lens group, which serves as a focal length varying lens group, becomes large at the time of zooming and, consequently, positions where rays pass the lens system in the wide position (W) become different from positions where rays pass the lens system in the teleposition (T). Especially, offaxial rays which pass the rearmost lens (the lens arranged on the image side) of the second lens group pass the marginal portion of said lens, and the outer diameters of the lenses become necessarily large. As a result, it becomes difficult to correct chromatic aberration and monochromatic aberrations in well balanced state. Therefore, a zoom lens system comprising two lens groups is not suitable for making the vari-focal ratio high.

The zoom lens system disclosed by Japanese published unexamined patent application No. 137813/83 is known as a zoom lens system comprising three lens groups. However, the above-mentioned known zoom lens system is arranged only by dividing a part of the first or second lens group into two portions and, from the view point of basic composition, said known zoom lens system may be regarded as a zoom lens system comprising two lens groups. The above-mentioned kind of zoom lens system is advantageous for correction of aberrations but does not contribute to increase of the vari-focal ratio.

Known zoom lens systems described so far are arranged to be used with a camera with a lens shutter as mentioned before or to be used with a video camera or the like and are arranged to make the lens system compact by utilizing the fact that it is not necessary to take the restriction related to the back focal length into consideration unlike the case of lens systems for single-lens reflex cameras.

However, even in case of a lens system for a camera with a lens shutter, it is necessaryb to avoid making the focal length short by paying attention only to correction of aberrations when consideration is given to the compactness of the lens system, flare to be caused by detrimental rays and so forth.

Furthermore, in cases of known zoom lens systems described so far, the optical performance is not satisfactory in spite of the fact that the vari-focal ratio is about 1.5 only and, especially, correction of chromatic aberration and curvature of field is not sufficient in most cases. Therefore, most of them do not have allowance to make the vari-focal ratio high.

As described so far, a zoom lens system comprising two lens groups and a zoom lens system comprising three lens groups arranged by developing the above-mentioned zoom lens system comprising two lens groups are not suitable for making the vari-focal ratio high because the maximum amount of movement for zooming required for the focal length varying lens group becomes large, the magnification to be imparted to said lens group becomes high, and it is extremely difficult to attain favourable optical performance over the whole vari-focal range.

When the above-mentioned points are taken into consideration, it may be considered thata zoom lens system can be made compact when the zoom lens system is arranged to comprise four lens groups by distributing refractive power to respective lens groups in such manner as positive, negative, positive and negative in the order from the object side as shown in FIG. 2, in other words, when the zoom lens system is arranged to comprise a first lens group $G_1$ having positive refractive power, a second lens group $G_2$ having negative refractive power, a third lens group $G_3$ having positive refractive power, and a fourth lens group $G_4$ having negative refractive power, and when said zoom lens system is arranged to move respective lens groups as shown in FIG. 2 at the time of zooming so that the magnifications are thereby imparted to respective lens groups and so that the lens systemis thereby made compact.

The zoom lens system disclosed by Japanese published unexamined patent application No. 57814/85 is known as a zoom lens system comprising four lens groups whose refractive powers are arranged to be positive, negative, positive and negative in the order from the object side. FIG. 3 shows the pattern of movements of respective lens groups of said known zoom lens system at the time of zooming. The zooming method shown in FIG. 3 is already popular in case of zoom lens systems for single-lens reflex cameras. Said zooming method is characterized in that the second lens group is kept fixed at the time of zooming so that the number of movable lens groups becomes three. For said known zoom lens system, it is not necessary to make the back focal length longer than required. Therefore, said known zoom lens system is arranged to have a telephoto type composition in order to make the lens system compact and may be considered that it has such composition that the first lens group of the afore-mentioned known zoom lens system comprising two lens groups is divided into two lens groups. However, in case of said known zoom lens system, the vari-focal ratio is about 1.6 only, and this degree of vari-focal ratio can be attained also by a zoom lens system comprising two lens groups. Moreover, when it is attempted to make the vari-focal ratio higher, the airspace between the second and third lens groups along the optical axis should be made sufficiently wide in the wide position in order to prevent the mechanical interference between the lens groups to be caused in the teleposition because the second lens group is arranged to be kept fixed at the time of zooming and, therefore, it becomes difficult to made the lens system compact.

SUMMARY OF THE INVENTION

It is, therefore, a primary object of the present invention to provide a compact high vari-focal ratio zoom lens system which is to be used with a camera with a lens shutter or the like to which a particular restricting condition related to the back focal length is not applied, said compact high vari-focal ratio zoom lens system being arranged that the vari-focal ratio thereof when zoomed from the wide position to the teleposition (the field angles from 63° to 23°) is at least 2 or higher than 2.

The zoom lens system according to the present invention is arranged to comprise a first lens group having positive refractive power, a second lens group having negative refractive power, a third lens group having positive refractive power, and a fourth lens group having negative refractive power in the order from the object side and is arranged that the first lens group, second lens group, third lens group and fourth lens group are respectively moved toward the object side along the optical axis as shown in FIG. 4 at the time of zooming from the wide position (W) to the teleposition (T).

To ensure a vari-focal ratio of at least 2 or higher than 2 for the zoom lens system according to the present invention contrarily to the fact that the vari-focal ratios of known zoom lens systems to be used with a camera with a lens shutter are smaller than 2 and, at the same time, to make the overall length of the lens system short, the zoom lens system according to the present invention is arranged as a zoom lens system comprising four lens groups and is arranged to individually move respective lens groups so that the focal length varying function is thereby alloted to said respective lens groups so as to thereby obtain a high vari-focal ratio.

To make the overall length of the lens system short, as a particular restricting condition related to the back focal length is not applied, the lens system should be arranged to have telephoto-type distribution of refractive power in the wide position unlike the case of zoom lens systems for single-lens reflex cameras. Therefore, in the zoom lens system according to the present invention, the fourth lens group is arranged tohave negative refractive power as described already.

On the other hand, it is important to adequately decide the ranges of vari-focal ratios to be alloted to respective lens groups. For this purpose, the zoom lens system according to the present invention is arranged to move the second lens group toward the object side at the time of zooming from the wide position to the teleposition so as to thereby make it possible toarrange the lens system small in size in the wide position.

The zoom lens system according to the present invention is arranged based on the above-mentioned basic composition and, moreover, arranged that the ranges of vari-focal ratios alloted to respective lens groups fulfill the following conditions:

$$0.03 < \frac{\beta_{4T}}{\beta_{4W}} \cdot \phi_W < 0.07 \quad (1)$$

$$0.3 < \beta_{2T} \cdot \beta_{3T} < 1.0 \quad (2)$$

$$5 < \frac{1 - \beta_{4W}}{\phi_4} < 20 \quad (3)$$

where, reference symbol $\beta_{2T}$ represents the lateral magnification of the second lens group in the teleposition, reference symbol $\beta_{3T}$ represents the lateral magnification of the third lens group in the teleposition, reference symbol $\beta_{4T}$ represents the lateral magnification of the fourth lens group in the teleposition, reference symbol $\beta_{4W}$ represents the lateral magnification of the fourth lens group in the wide position, reference symbol $\phi_W$ represents the refractive power of the lens system as a whole in the wide position, and reference symbol $\phi_4$ represents the refractive power of the fourth lens group.

The condition (1) defines the lateral magnification of the fourth lens group within the vari-focal range to be alloted to the fourth lens group, in other words, within the range of refractive power to be alloted to the fourth lens group, when adopting the power distribution which is important for obtaining a lens system whose back focal length is short especially in the wide position. If the value defined by the condition (1) becomes larger than the upper limit thereof, the vari-focal range alloted to the fourth lens group becomes wide, and the amount of movement of the fourth lens group itself required for zooming becomes large. As a result, the overall length of the lens system becomes long and, at the same time, it becomes impossible to correct the flatness of image surface. Moreover, the mechanism of the lens mount becomes complicated. If the value defined by the condition (1) becomes smaller than the lower limit thereof, the magnification to be alloted to the second and third lens groups become high, and it becomes necessary to make the amounts of movement of the second and third lens groups large or to make the amount of movement of the first lens group large.

The condition (2) defines the vari-focal ratios to be alloted to the second and third lens groups. If the value of $\beta_{2T} \cdot \beta_{3T}$ becomes larger than the upper limit of the condition (2), the amounts of movement of the second and third lens groups at the time of zooming become large, and this is not desirable. If the value of $\beta_{2T} \cdot \beta_{3T}$ becomes smaller than the lower limit of the condition (2), the magnification to be alloted to the fourth lens group becomes large and, consequently, the amount of movement of the fourth lens group increases unless the refractive power of the fourth lens group is not varied. When the refractive power of the fourth lens group is made strong in the above-mentioned case, the amount of movement of the fourth lens group becomes small. However, aberrations including curvature of field becomes unfavourable, and it is difficult to obtain favourable performance.

When the value of $\beta_{2T} \cdot \beta_{3T}$ is made smaller than 0.7, the amounts of movement of the second and third lens groups at the time of zooming become still smaller, and this is desirable. In other words, it is more preferable to arrange that the condition (2') shown below is fulfilled.

$$0.3 < \beta_{2T} \cdot \beta_{3T} < 0.7 \tag{2'}$$

The condition (3) defines the range of back focal length in he wide position which is decided by the magnification of the fourth lens group in the wide position and refractive power of the fourth lens group. If the value defined by the conditio (3) becomes larger than the upper limit thereof, the overall length of the lens system becomes long, and this is contrary to the object of the present invention. As factors which make the value defined by the condition (3) larger than the upper limit thereof, it may be considered that the refractive power of the fourth lens group becomes weak as a result of the fact that the refractive power of the first lens group and the refractive power of the third lens group are made weak, or otherwise, it may be considered that the refractive power of the fourth lens group becomes weak as a result of the fact that the refractive power of the second lens group is made strong. When the refractive power of the fourth lens group becomes weak, the fack focal length of the lens system becomes long and, consequently, the overall length of the lens system also becomes long. If the value defined by the condition (3) becomes smaller than the lower limit therof, it becomes necessary to increase the number of lenses constituting the fourth lens group and, moreover, the shapes of lenses constituting the fourth lens group becomes such shapes that cause increase in the number of manufacturing processes.

For the zoom lens system according to the present invention, it is preferable to arrange that respective lens groups having lens configurations as described below. That is, it is preferable to arrange that the first lens group having positive refractive power comprises at least one negative lens and at least one positive lens, the second lens group having negative refractive power comprises at least one cemented doublet which consists of a negative lens and a positive lens cemented together, the third lens group having positive refractive power comprises at least two positive lens and at least one negative lens, and the fourth lens group having negative refractive power comprises at least one positive lens and at least one negative lens.

The zoom lens system according to the present invention described so far is arranged that all of the lens groups thereof are moved individually. However, it is possible to obtain a zoom lens system which makes it possible to attain the object of the present invention also when it is arranged that, out of respective lens groups, the first and third lens groups are moved integrally with each other as shown in FIG. 5. When arranged as above, the lens moving mechanism required for moving respective lens groups at the time of zooming will be simplified and, consequently, it is possible to make the number of manufacturing processes small and to make the cost of production low. Besides, when it is arranged that the aperture stop is moved together with the third lens group, it is possible to arrange that the position of the entrance pupil does not vary largely at the time of zooming, and it is possible to ensure satisfactory intensity of light in the marginal portion. As a result, it becomes possible to easily make the shortest object distance for promixity photography shorter than those of known zoom lens systems, and this is desirable.

When the zoom lens system according to the present invention is arranged to move the first and third lens goups integrally with each other as described in the above, the preferable distribution of refractive power to respective lens groups becomes somewhat different, and it is necessary to fulfill the conditions (4), (5) and (6) shown below:

$$0.8 < \frac{\phi_{123W}}{\phi_W} < 1.6 \tag{4}$$

$$0.3 < \beta_{2T} \cdot \beta_{3T} < 1.0 \tag{5}$$

$$1.1 < \frac{\beta_{4T}}{\beta_{4W}} < 2.8 \tag{6}$$

where, reference symbol $\phi_{123W}$ represents the total refractive power of the first, second and third lens groups.

The condition (4) defines the total refractive power of the first, second and third lens groups in the wide position and seves to adequately decide the distribution of refractive power in the wide position, which is arranged as the standard position, where the overall length of the lens system becomes the shortest and said condition serves to shorten the back focal length at that time to the shortest required value so as to thereby make the lens system compact.

When the value defined by the condition (4) becomes larger than the upper limit thereof, it is advantageous for making the lens system compact. However, in the composition of the actual thick lens system, Petzval's sum decreases, the image surface inclines toward the "plus" side, the refractive power becomes strong, residual lateral charomatic aberration increases and, at the same time, it becomes difficult to correct monochromatic aberrations. When the value defined by the condition (4) becomes smaller than the lower limit thereof, it is advantageous for correction of aberrations. However, the overall length of the lens system becomes long. Moreover, in the wide position, the rear principal point is further put toward the object side in the lens system, the back focal length becomes short, both of the overall length and outer diameter of the lens system become large and, consequently, it becomes difficult to make the lens system compact.

The condition (5) is the same as the condition (2) described before. When the distribution of refractive power in he wide position is decided as defined by the condition (4), as the first and third lens groups are to be moved integrally with each other at the time of zooming, the amounts of movement of respective lens groups at the time of zooming get somewhat limited and, therefore, this condition becomes more important here. Besides, the meaning of the condition (5) is somewhat different from the afore-mentioned case that the first and third lens groups are move individually at the time of zooming. That is, the meaning of the condition (5) is as follows.

When the value of $\beta_{2T} \cdot \beta_{3T}$ becomes larger than the upper limit of the condition (5), the magnifications to be alloted to the second and third lens groups become excessively high and, when the distribution of refractive power is decided on condition that the first and third lens groups are moved integrally, the amounts of movement of the first, second and third lens groups become too large unless the refractive powers of the first, second and third lens groups are made strong. On the other hand, the magnification to be alloted to the fourth lens group becomes low, and it is possible to make the refractive power of the fourth lens group weak. However, Petzval's sum of the first, second and third lens groups is overcorrected and, moreover, it becomes difficult to correct residual aberrations by the fourth lens group. When the value of $\beta_{2T} \cdot \beta_{3T}$ becomes smaller than the lower limit of the condition (5), the magnification to be alloted to the fourth lens group becomes high. Therefore, it is necessary to make the refractive power of the fourth lens group strong so that the amount of movement of the fourth lens group at the time of zooming becomes small in order to thereby prevent the mechanical interference between the lens groups in the teleposition, and this is not preferable for correction of aberrations. On the other hand, the magnitications to be alloted to the second and third lens groups become low, and it is possible to make the refractive power of the second and third lens groups weak. In that case, however, the refractive power of the first lens group should be made also weak. Therefore, when it is attempted to perform focusing by means of the first lens group etc., the shortest object distance for proximity photography becomes long.

The condition (6) defines the lateral magnification of the fourth lens group within the vari-focal range which is alloted to the fourth lens group so as to thereby select the back focal length in the wide position adequately and to thereby attain a high vari-focal ratio.

If the value defined by the condition (6) becomes larger than the upper limit thereof, the vari-focal range to be alloted to the fourth lens group becomes wide, the amount of movement of the fourth lens groups itself at the time of zooming becomes large, and the overall length of the lens system becomes long. As a result, the back focal length of the lens system in the teleposition becomes very long. To prevent the above, it is necessary to make the refractive power of the fourth lens group weak and, it is then difficult to correct the flatness of image surface. If the value defined by the condition (6) becomes smaller than the lower limit thereof, the magnification to be alloted to the fourth lens group becomes low and, consequently, it becomes difficult to attain a high vari-focal ratio. Besides, to make the vari-focal ratio of the lens system high in case that the vari-focal range of the fourth lens group becomes smaller than the lower limit of the condition (6), it is unavoidable to make the magnifications to be alloted to the second and third lens groups higher. In that case, as the zooming method to integrally move the first and third lens groups at the time of zooming is adopted, mechanical interference between the lens groups occurs in the teleposition. To prevent the above, the refractive powers of respective lens groups should be made stronger than necessary. As a result, it becomes difficult to correct aberrations, and this is not desirable.

When the zoom lens system according to the present invention, which is arranged that the refractive power is distributed to respective lens groups so as to fulfill the conditions (4), (5) and (6) described so far and which is arranged to adequately select the amounts of movement of respective lens groups at the time of zooming by moving the first and third lens groups integrally with each other, is further arranged that respective lens groups have lens configurations described below, it is possible to obtain favourable optical performance over the whole vari-focal range. That is, it is preferable to arrange that the first lens groups comprises at least one negative lens and at least one positive lens, the second lens group comprises at least one negative lens and at least one positive lens, the third lens group comprises at least two positive lenses and at least one negative lens, and the fourth lens group comprises at least one positive lens and at least one negative lens.

For making the vari-focal ratio of the zoom lens system according to the present invention still higher and making the performance thereof more favourable, it is effective to adopt an aspherical surface. That is, when an aspherical surface is provided to one of lens groups constituting the lens system, especially to the second lens group or fourth lens group, it is possible to make the refractive powers of lens components weak and, therefore, it is possible to make the design easier and to improve the performance.

The shape of the aspherical surface to be adopted is expressed by the formula shown below when the x axis is traced in the direction of the optical axis, the y axis is traced in the direction perpendicular to the optical axis, and the radius of curvatuve of the vertex portion of the aspherical surface is represented by reference symbol $r_k$:

$$x_k = \frac{y^2_k}{r_k + r_k \sqrt{1 - (y_k/r_k)^2}} + A_k y^4_k + B_k y^6_k + C_k y^8_k + D_k y^{10}_k$$

where, reference symbols $A_k$, $B_k$, $C_k$ and $D_k$ respectively represent the coefficients of aspherical surface.

DETAILED DESCRIPTION OF THE PREFERRED EMBODIMENTS

Figure 1:
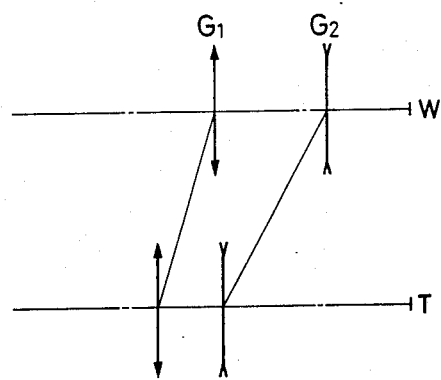
FIGS. 1, 2 and 3 respectively show the states of movement of respective lens groups of known zoom lens systems at the time of zooming.
Figure 2:
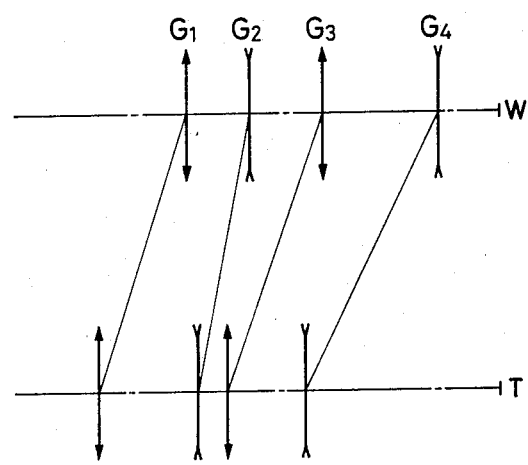
Figure 3:
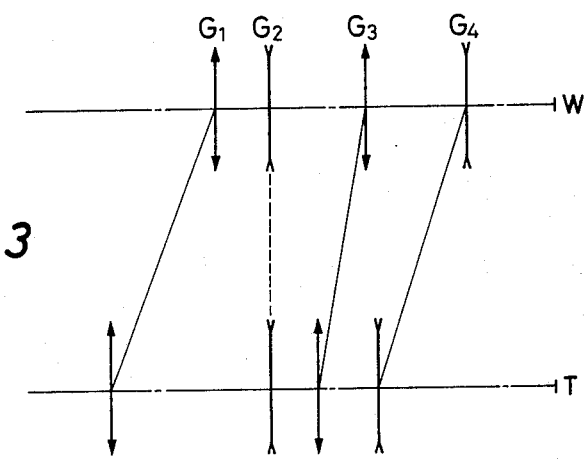
Figure 4:
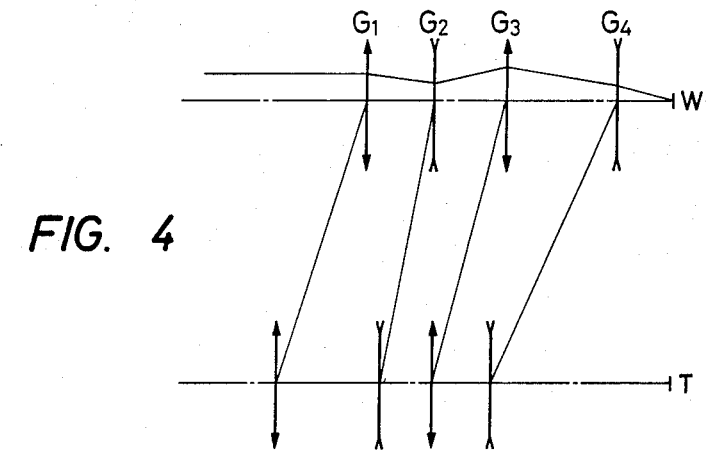
FIGS. 4 and 5 respectively show the states of movement of respective lens groups of the zoom lens system according to the present invention at the time of zooming.

Now, preferred embodiments of the compact high vari-focal ratio zoom lens system according to the present invention described so far are shown below.

Embodiment 1

$f = 39.03 \sim 84.0$, $F/4.5 \sim 5.6$

| | | | |
|---|---|---|---|
| $r_1 = 1000.000$ | | | |
| | $d_1 = 1.500$ | $n_1 = 1.84666$ | $\nu_1 = 23.88$ |
| $r_2 = 54.037$ | | | |
| | $d_2 = 3.500$ | $n_2 = 1.69680$ | $\nu_2 = 55.52$ |
| $r_3 = 685.901$ | | | |
| | $d_3 = 0.150$ | | |
| $r_4 = 30.109$ | | | |
| | $d_4 = 3.600$ | $n_3 = 1.51741$ | $\nu_3 = 49.21$ |
| $r_5 = -735.755$ | | | |
| | $d_5 = l_1$ | | |
| $r_6 = -49.662$ | | | |
| | $d_6 = 1.219$ | $n_4 = 1.77250$ | $\nu_4 = 49.66$ |
| $r_7 = 19.014$ | | | |
| | $d_7 = 3.001$ | $n_5 = 1.80518$ | $\nu_5 = 25.43$ |
| $r_8 = 94.078$ | | | |
| | $d_8 = 1.292$ | | |
| $r_9 = -26.594$ | | | |
| | $d_9 = 1.180$ | $n_6 = 1.72916$ | $\nu_6 = 54.68$ |
| $r_{10} = -46.031$ | | | |
| | $d_{10} = l_2$ | | |
| $r_{11} = \infty$ (stop) | | | |

-continued $f = 39.03 \sim 84.0$, $F/4.5 \sim 5.6$

| | | | |
|---|---|---|---|
| | $d_{11} = 2.000$ | | |
| $r_{12} = 39.181$ | | | |
| | $d_{12} = 1.708$ | $n_7 = 1.67607$ | $\nu_7 = 48.71$ |
| $r_{13} = -46.680$ | | | |
| | $d_{13} = 0.150$ | | |
| $r_{14} = 23.666$ | | | |
| | $d_{14} = 2.521$ | $n_8 = 1.58144$ | $\nu_8 = 40.75$ |
| $r_{15} = -30.712$ | | | |
| | $d_{15} = 0.941$ | | |
| $r_{16} = -21.719$ | | | |
| | $d_{16} = 1.603$ | $n_9 = 1.80518$ | $\nu_9 = 25.43$ |
| $r_{17} = 24.143$ | | | |
| | $d_{17} = 2.484$ | | |
| $r_{18} = 45.176$ | | | |
| | $d_{18} = 3.266$ | $n_{10} = 1.56732$ | $\nu_{10} = 42.83$ |
| $r_{19} = -21.874$ | | | |
| | $d_{19} = l_3$ | | |
| $r_{20} = -26.797$ | | | |
| | $d_{20} = 2.720$ | $n_{11} = 1.68893$ | $\nu_{11} = 31.08$ |
| $r_{21} = -16.928$ | | | |
| | $d_{21} = 3.000$ | | |
| $r_{22} = -15.303$ | | | |
| | $d_{22} = 1.295$ | $n_{12} = 1.77250$ | $\nu_{12} = 49.66$ |
| $r_{23} = -510.056$ | | | |

| | $l_1$ | $l_2$ | $l_3$ |
|---|---|---|---|
| (W) | 1.55 | 6.568 | 13.44 |
| (S) | 6.817 | 5.252 | 3.306 |
| (T) | 15.018 | 8.553 | 3.116 |

$\dfrac{\beta_{4T}}{\beta_{4W}} \cdot \phi_W = 0.043$, $\beta_{2T} \cdot \beta_{3T} = 0.55$ $\dfrac{1 - \beta_{4W}}{\phi_4} = 10.43$

Embodiment 2

$f = 41.8 \sim 115.2$, $F/4.6 \sim F/5.8$

| | | | |
|---|---|---|---|
| $r_1 = 576.703$ | | | |
| | $d_1 = 1.250$ | $n_1 = 1.84666$ | $\nu_1 = 23.88$ |
| $r_2 = 52.295$ | | | |
| | $d_2 = 3.334$ | $n_2 = 1.69680$ | $\nu_2 = 55.52$ |
| $r_3 = 315.082$ | | | |
| | $d_3 = 0.044$ | | |
| $r_4 = 34.136$ | | | |
| | $d_4 = 3.503$ | $n_3 = 1.51733$ | $\nu_3 = 49.21$ |
| $r_5 = -145.821$ | | | |
| | $d_5 = l_1$ | | |
| $r_6 = -46.750$ | | | |
| | $d_6 = 1.180$ | $n_4 = 1.77250$ | $\nu_4 = 49.66$ |
| $r_7 = 15.696$ | | | |
| | $d_7 = 2.931$ | $n_5 = 1.80518$ | $\nu_5 = 25.43$ |
| $r_8 = 57.301$ | | | |
| | $d_8 = 2.000$ | | |
| $r_9 = -38.594$ | | | |
| | $d_9 = 1.141$ | $n_6 = 1.72916$ | $\nu_6 = 54.68$ |
| $r_{10} = -54.320$ | | | |
| | $d_{10} = l_2$ | | |
| $r_{11} = \infty$ (stop) | | | |
| | $d_{11} = 1.950$ | | |
| $r_{12} = 133.176$ | | | |
| | $d_{12} = 2.650$ | $n_7 = 1.67603$ | $\nu_7 = 38.63$ |
| $r_{13} = -41.274$ | | | |
| | $d_{13} = 0.165$ | | |
| $r_{14} = 16.466$ | | | |
| | $d_{14} = 3.500$ | $n_8 = 1.57863$ | $\nu_8 = 58.93$ |
| $r_{15} = -123.275$ | | | |
| | $d_{15} = 0.940$ | | |
| $r_{16} = -46.483$ | | | |
| | $d_{16} = 1.649$ | $n_9 = 1.80518$ | $\nu_9 = 25.43$ |
| $r_{17} = 18.973$ | | | |
| | $d_{17} = 2.409$ | | |
| $r_{18} = 42.751$ | | | |
| | $d_{18} = 3.296$ | $n_{10} = 1.56732$ | $\nu_{10} = 42.83$ |
| $r_{19} = -28.426$ | | | |
| | $d_{19} = l_3$ | | |

-continued f = 41.8~115.2, F/4.6~F/5.8

| | | | |
|---|---|---|---|
| $r_{20} = -32.306$ | | | |
| | $d_{20} = 4.000$ | $n_{11} = 1.78472$ | $\nu_{11} = 25.68$ |
| $r_{21} = -19.556$ | | | |
| | $d_{21} = 2.998$ | | |
| $r_{22} = -17.373$ | | | |
| | $d_{22} = 1.288$ | $n_{12} = 1.77250$ | $\nu_{12} = 49.66$ |
| $r_{23} = -465.852$ | | | |

| | $l_1$ | $l_2$ | $l_3$ |
|---|---|---|---|
| (W) | 0.879 | 9.411 | 22.545 |
| (S) | 5.423 | 7.473 | 10.934 |
| (T) | 11.495 | 5.293 | 2.221 |

$\frac{\beta_{4T}}{\beta_{4W}} \cdot \phi_W = 0.052$, $\quad \beta_{2T} \cdot \beta_{3T} = 0.648$ $\frac{1 - \beta_{4W}}{\phi_4} = 8.8$ Embodiment 3 f = 39.5~100.8, F/4.5~F/5.8

| | | | |
|---|---|---|---|
| $r_1 = 704.210$ | | | |
| | $d_1 = 1.034$ | $n_1 = 1.84666$ | $\nu_1 = 23.88$ |
| $r_2 = 55.010$ | | | |
| | $d_2 = 2.914$ | $n_2 = 1.69100$ | $\nu_2 = 54.84$ |
| $r_3 = 483.967$ | | | |
| | $d_3 = 0.048$ | | |
| $r_4 = 39.471$ | | | |
| | $d_4 = 3.279$ | $n_3 = 1.53172$ | $\nu_3 = 48.90$ |
| $r_5 = -144.953$ | | | |
| | $d_5 = l_1$ | | |
| $r_6 = -38.351$ | | | |
| | $d_6 = 1.142$ | $n_4 = 1.78650$ | $\nu_4 = 50.00$ |
| $r_7 = 15.821$ | | | |
| | $d_7 = 2.882$ | $n_5 = 1.80518$ | $\nu_5 = 25.43$ |
| $r_8 = 60.536$ | | | |
| | $d_8 = 1.970$ | | |
| $r_9 = -41.166$ | | | |
| | $d_9 = 1.139$ | $n_6 = 1.72600$ | $\nu_6 = 53.56$ |
| $r_{10} = -44.549$ | | | |
| $r_{11} = \infty$ (stop) | | | |
| | $d_{10} = l_2$ | | |
| | $d_{11} = 1.936$ | | |
| $r_{12} = 113.494$ | | | |
| | $d_{12} = 2.601$ | $n_7 = 1.66998$ | $\nu_7 = 39.27$ |
| $r_{13} = -40.273$ | | | |
| | $d_{13} = 0.080$ | | |
| $r_{14} = 15.651$ | | | |
| | $d_{14} = 3.500$ | $n_8 = 1.57250$ | $\nu_8 = 57.76$ |
| $r_{15} = -84.039$ | | | |
| | $d_{15} = 0.940$ | | |
| $r_{16} = -43.748$ | | | |
| | $d_{16} = 1.666$ | $n_9 = 1.80518$ | $\nu_9 = 25.43$ |
| $r_{17} = 17.703$ | | | |
| | $d_{17} = 2.414$ | | |
| $r_{18} = 41.785$ | | | |
| | $d_{18} = 3.310$ | $n_{10} = 1.56732$ | $\nu_{10} = 42.83$ |
| $r_{19} = -28.109$ | | | |
| | $d_{19} = l_3$ | | |
| $r_{20} = -36.261$ | | | |
| | $d_{20} = 3.907$ | $n_{11} = 1.76182$ | $\nu_{11} = 26.52$ |
| $r_{21} = -19.227$ | | | |
| | $d_{21} = 3.003$ | | |
| $r_{22} = -16.570$ | | | |
| | $d_{22} = 1.196$ | $n_{12} = 1.78650$ | $\nu_{12} = 50.00$ |
| $r_{23} = -7206.869$ | | | |

| | $l_1$ | $l_2$ | $l_3$ |
|---|---|---|---|
| (W) | 0.649 | 6.461 | 13.086 |
| (S) | 9.397 | 7.647 | 5.53 |
| (T) | 19.718 | 10.224 | 2.222 |

$\frac{\beta_{4T}}{\beta_{4W}} \cdot \phi_W = 0.052$, $\quad \beta_{2T} \cdot \beta_{3T} = 0.568$ -continued f = 39.5~100.8, F/4.5~F/5.8

$\frac{1 - \beta_{4W}}{\phi_4} = 8.86$

Embodiment 4 f = 39.5~100.8, F/4.66~6.38

| | | | |
|---|---|---|---|
| $r_1 = 349.9503$ | | | |
| | $d_1 = 1.5000$ | $n_1 = 1.80518$ | $\nu_1 = 25.43$ |
| $r_2 = 42.1930$ | | | |
| | $d_2 = 1.0973$ | | |
| $r_3 = 70.9524$ | | | |
| | $d_3 = 3.5700$ | $n_2 = 1.63854$ | $\nu_2 = 55.38$ |
| $r_4 = -382.0492$ | | | |
| | $d_4 = 0.2000$ | | |
| $r_5 = 32.5644$ | | | |
| | $d_5 = 4.5000$ | $n_3 = 1.54814$ | $\nu_3 = 45.78$ |
| $r_6 = -220.5084$ | | | |
| | $d_6 = l_1$ | | |
| $r_7 = -47.9514$ | | | |
| | $d_7 = 1.2622$ | $n_4 = 1.73500$ | $\nu_4 = 49.82$ |
| $r_8 = 16.4175$ | | | |
| | $d_8 = 0.6324$ | | |
| $r_9 = 18.1342$ | | | |
| | $d_9 = 2.7671$ | $n_5 = 1.80518$ | $\nu_5 = 25.43$ |
| $r_{10} = 60.3650$ (aspherical surface) | | | |
| | $d_{10} = l_2$ | | |
| $r_{11} = \infty$ (stop) | | | |
| | $d_{11} = 2.3500$ | | |
| $r_{12} = -80.2003$ | | | |
| | $d_{12} = 2.6000$ | $n_6 = 1.62374$ | $\nu_6 = 47.10$ |
| $r_{13} = -23.3793$ | | | |
| | $d_{13} = 0.1624$ | | |
| $r_{14} = 18.1182$ | | | |
| | $d_{14} = 3.4320$ | $n_7 = 1.56873$ | $\nu_7 = 63.16$ |
| $r_{15} = -82.4988$ | | | |
| | $d_{15} = 0.8538$ | | |
| $r_{16} = -28.6287$ | | | |
| | $d_{16} = 1.6178$ | $n_8 = 1.80610$ | $\nu_8 = 33.27$ |
| $r_{17} = 26.6319$ | | | |
| | $d_{17} = 2.1808$ | | |
| $r_{18} = 87.2734$ | | | |
| | $d_{18} = 3.2322$ | $n_9 = 1.56873$ | $\nu_9 = 63.16$ |
| $r_{19} = -20.1861$ | | | |
| | $d_{19} = l_3$ | | |
| $r_{20} = -38.1009$ | | | |
| | $d_{20} = 3.6500$ | $n_{10} = 1.74950$ | $\nu_{10} = 35.27$ |
| $r_{21} = -20.1587$ | | | |
| | $d_{21} = 2.9373$ | | |
| $r_{22} = -18.0802$ | | | |
| | $d_{22} = 1.6014$ | $n_{11} = 1.77250$ | $\nu_{11} = 49.66$ |
| $r_{23} = 418.7028$ | | | |

Aspherical surface $A_{10} = -0.20573 \times 10^{-6}$ $\quad B_{10} = -0.17169 \times 10^{-7}$
$C_{10} = -0.16365 \times 10^{-10}$ $\quad D_{10} = 0.44883 \times 10^{-11}$

| | $l_1$ | $l_2$ | $l_3$ |
|---|---|---|---|
| (W) | 1.709 | 12.442 | 20.452 |
| (S) | 12.374 | 8.970 | 10.339 |
| (T) | 17.912 | 5.302 | 2.027 |

$\frac{\beta_{4T}}{\beta_{4W}} \cdot \phi_W = 0.047$, $\quad \beta_{2T} \cdot \beta_{3T} = 0.608$ $\frac{1 - \beta_{4W}}{\phi_4} = 9.86$ Embodiment 5 f = 39.946~102.429, F/4.66~6.38
$2\omega = 56.877°~23.851°$

| | | | |
|---|---|---|---|
| $r_1 = 348.9483$ | | | |
| | $d_1 = 1.5000$ | $n_1 = 1.84666$ | $\nu_1 = 23.88$ |

-continued

| $f = 39.946 \sim 102.429, F/4.66 \sim 6.38$ |
| $2\omega = 56.877° \sim 23.851°$ |

| $r_2 = 44.3968$ | | | |
| | $d_2 = 0.8800$ | | |
| $r_3 = 62.5952$ | | | |
| | $d_3 = 3.5700$ | $n_2 = 1.69680$ | $\nu_2 = 55.52$ |
| $r_4 = -3799.1113$ | | | |
| | $d_4 = 0.2000$ | | |
| $r_5 = 30.0416$ | | | |
| | $d_5 = 4.5000$ | $n_3 = 1.53358$ | $\nu_3 = 51.56$ |
| $r_6 = -151.7917$ | | | |
| | $d_6 = l_1$ | | |
| $r_7 = -58.1221$ | | | |
| | $d_7 = 1.3000$ | $n_4 = 1.77250$ | $\nu_4 = 49.66$ |
| $r_8 = 14.6035$ | | | |
| | $d_8 = 2.8500$ | $n_5 = 1.80518$ | $\nu_5 = 25.43$ |
| $r_9 = 70.0508$ | | | |
| | $d_9 = 1.9000$ | | |
| $r_{10} = -42.0914$ | | | |
| | $d_{10} = 1.3000$ | $n_6 = 1.72916$ | $\nu_6 = 54.68$ |
| $r_{11} = -211.0582$ | | | |
| | $d_{11} = l_2$ | | |
| $r_{12} = \infty$ (stop) | | | |
| | $d_{12} = 1.9126$ | | |
| $r_{13} = 464.2233$ | | | |
| | $d_{13} = 2.5985$ | $n_7 = 1.63930$ | $\nu_7 = 44.88$ |
| $r_{14} = -28.1184$ | | | |
| | $d_{14} = 0.1624$ | | |
| $r_{15} = 20.4165$ | | | |
| | $d_{15} = 3.4320$ | $n_8 = 1.56873$ | $\nu_8 = 63.16$ |
| $r_{16} = -70.3713$ | | | |
| | $d_{16} = 1.1513$ | | |
| $r_{17} = -23.5502$ | | | |
| | $d_{17} = 1.6178$ | $n_9 = 1.80518$ | $\nu_9 = 25.43$ |
| $r_{18} = 39.3683$ | | | |
| | $d_{18} = 2.3623$ | | |
| $r_{19} = 227.2457$ | | | |
| | $d_{19} = 3.2322$ | $n_{10} = 1.56444$ | $\nu_{10} = 43.78$ |
| $r_{20} = -18.6168$ | | | |
| | $d_{20} = l_3$ | | |
| $r_{21} = -46.0692$ | | | |
| | $d_{21} = 3.6500$ | $n_{11} = 1.78470$ | $\nu_{11} = 26.30$ |
| $r_{22} = -21.2145$ | | | |
| | $d_{22} = 2.6559$ | | |
| $r_{23} = -17.1771$ | | | |
| | $d_{23} = 1.6014$ | $n_{12} = 1.78590$ | $\nu_{12} = 44.18$ |
| $r_{24} = 421.0666$ | | | |
| | $l_1$ | $l_2$ | $l_3$ |
| (W) | 2.237 | 11.564 | 19.142 |
| (S) | 6.756 | 7.045 | 11.05 |
| (T) | 10.802 | 2.999 | 4.1 |

$$\frac{\phi_{123}}{\phi_W} = 1.2707, \beta_{2T} \cdot \beta_{3T} = 0.7108$$

$$\frac{\beta_{4T}}{\beta_{4W}} = 1.874$$

Embodiment 6

| $f = 39.945 \sim 102.429, F/4.66 \sim 6.38$ |
| $2\omega = 56.877° \sim 23.851°$ |

| $r_1 = 348.7083$ | | | |
| | $d_1 = 1.5000$ | $n_1 = 1.84666$ | $\nu_1 = 23.88$ |
| $r_2 = 49.8456$ | | | |
| | $d_2 = 0.8800$ | | |
| $r_3 = 101.8490$ | | | |
| | $d_3 = 3.5700$ | $n_2 = 1.69680$ | $\nu_2 = 56.49$ |
| $r_4 = -205.0830$ | | | |
| | $d_4 = 0.2000$ | | |
| $r_5 = 27.8469$ | | | |
| | $d_5 = 4.5000$ | $n_3 = 1.53358$ | $\nu_3 = 51.56$ |
| $r_6 = -712.6568$ | | | |
| | $d_6 = l_1$ | | |
| $r_7 = -90.3467$ | | | |
| | $d_7 = 1.3000$ | $n_4 = 1.77250$ | $\nu_4 = 49.66$ |
| $r_8 = 14.7553$ | | | |
| | $d_8 = 0.6550$ | | |
| $r_9 = 15.6373$ | | | |

-continued

| $f = 39.945 \sim 102.429, F/4.66 \sim 6.38$ |
| $2\omega = 56.877° \sim 23.851°$ |

| | $d_9 = 2.8500$ | $n_5 = 1.80518$ | $\nu_5 = 25.43$ |
| $r_{10} = 69.0344$ | | | |
| | $d_{10} = 1.4101$ | | |
| $r_{11} = -67.4350$ | | | |
| | $d_{11} = 1.3000$ | $n_6 = 1.72916$ | $\nu_6 = 54.68$ |
| $r_{12} = 164.8495$ | | | |
| | $d_{12} = l_2$ | | |
| $r_{13} = \infty$ (stop) | | | |
| | $d_{13} = 1.9126$ | | |
| $r_{14} = -490.4177$ | | | |
| | $d_{14} = 2.5985$ | $n_7 = 1.63930$ | $\nu_7 = 44.88$ |
| $r_{15} = -27.8080$ | | | |
| | $d_{15} = 0.1624$ | | |
| $r_{16} = 18.8801$ | | | |
| | $d_{16} = 3.4320$ | $n_8 = 1.56873$ | $\nu_8 = 63.16$ |
| $r_{17} = -57.4396$ | | | |
| | $d_{17} = 1.1500$ | | |
| $r_{18} = -24.3014$ | | | |
| | $d_{18} = 1.6178$ | $n_9 = 1.80518$ | $\nu_9 = 25.43$ |
| $r_{19} = 32.9383$ | | | |
| | $d_{19} = 2.3623$ | | |
| $r_{20} = 381.4716$ | | | |
| | $d_{20} = 3.2322$ | $n_{10} = 1.56444$ | $\nu_{10} = 43.78$ |
| $r_{21} = -18.6397$ | | | |
| | $d_{21} = l_3$ | | |
| $r_{22} = -55.1813$ | | | |
| | $d_{22} = 3.6500$ | $n_{11} = 1.78470$ | $\nu_{11} = 26.30$ |
| $r_{23} = -22.3069$ | | | |
| | $d_{23} = 2.6559$ | | |
| $r_{24} = -18.0126$ | | | |
| | $d_{24} = 1.6014$ | $n_{12} = 1.79500$ | $\nu_{12} = 45.29$ |
| $r_{25} = 421.6795$ | | | |
| | $l_1$ | $l_2$ | $l_3$ |
| (W) | 1.901 | 12.304 | 19.528 |
| (S) | 7.433 | 6.773 | 10.884 |
| (T) | 11.404 | 2.801 | 2.394 |

$$\frac{\phi_{123}}{\phi_W} = 1.2405, \beta_{2T} \cdot \beta_{3T} = 0.7322$$

$$\frac{\beta_{4T}}{\beta_{4W}} = 1.839$$

Embodiment 7

| $f = 39.946 \sim 102.429, F/4.66 \sim 6.38$ |
| $2\omega = 56.877° \sim 23.851°$ |

| $r_1 = 348.7211$ | | | |
| | $d_1 = 1.5000$ | $n_1 = 1.84666$ | $\nu_1 = 23.88$ |
| $r_2 = 48.5588$ | | | |
| | $d_2 = 0.8800$ | | |
| $r_3 = 167.0763$ | | | |
| | $d_3 = 3.5700$ | $n_2 = 1.69680$ | $\nu_2 = 55.52$ |
| $r_4 = -189.4483$ | | | |
| | $d_4 = 0.2000$ | | |
| $r_5 = 29.5620$ | | | |
| | $d_5 = 4.5000$ | $n_3 = 1.53358$ | $\nu_3 = 51.56$ |
| $r_6 = -170.1935$ | | | |
| | $d_6 = l_1$ | | |
| $r_7 = -51.6606$ | | | |
| | $d_7 = 1.3000$ | $n_4 = 1.77250$ | $\nu_4 = 49.66$ |
| $r_8 = 18.5047$ | | | |
| | $d_8 = 2.8500$ | $n_5 = 1.80518$ | $\nu_5 = 25.43$ |
| $r_9 = 159.0754$ | | | |
| | $d_9 = 1.9000$ | | |
| $r_{10} = -50.8129$ | | | |
| | $d_{10} = 1.3000$ | $n_6 = 1.72916$ | $\nu_6 = 54.68$ |
| $r_{11} = 642.0467$ | | | |
| | $d_{11} = l_2$ | | |
| $r_{12} = \infty$ (stop) | | | |
| | $d_{12} = 1.9126$ | | |
| $r_{13} = 163.0487$ | | | |
| | $d_{13} = 2.5985$ | $n_7 = 1.63930$ | $\nu_7 = 44.88$ |
| $r_{14} = -28.6154$ | | | |
| | $d_{14} = 0.1624$ | | |
| $r_{15} = 20.1618$ | | | |
| | $d_{15} = 3.4320$ | $n_8 = 1.56873$ | $\nu_8 = 63.16$ |

-continued $f = 39.946 \sim 102.429, F/4.66 \sim 6.38$
$2\omega = 56.877° \sim 23.851°$

| | | | |
|---|---|---|---|
| $r_{16} = -77.5756$ | | | |
| | $d_{16} = 1.1500$ | | |
| $r_{17} = -24.5784$ | | | |
| | $d_{17} = 1.6178$ | $n_9 = 1.80518$ | $\nu_9 = 25.43$ |
| $r_{18} = 37.0934$ | | | |
| | $d_{18} = 2.3623$ | | |
| $r_{19} = 1004.5794$ | | | |
| | $d_{19} = 3.2322$ | $n_{10} = 1.56444$ | $\nu_{10} = 43.78$ |
| $r_{20} = -18.5727$ | | | |
| | $d_{20} = l_3$ | | |
| $r_{21} = -45.8923$ | | | |
| | $d_{21} = 3.6500$ | $n_{11} = 1.78470$ | $\nu_{11} = 26.30$ |
| $r_{22} = -20.3180$ (aspherical surface) | | | |
| | $d_{22} = 2.6559$ | | |
| $r_{23} = -16.0969$ | | | |
| | $d_{23} = 1.6014$ | $n_{12} = 1.78590$ | $\nu_{12} = 44.18$ |
| $r_{24} = 421.4819$ | | | |

Aspherical surface coefficients
$A_{22} = -0.75814 \times 10^{-6}$
$B_{22} = -0.3655 \times 10^{-7}$
$C_{22} = 0.35896 \times 10^{-9}$
$D_{22} = -0.16527 \times 10^{-11}$

| | $l_1$ | $l_2$ | $l_3$ |
|---|---|---|---|
| (W) | 2.256 | 11.539 | 17.353 |
| (S) | 6.806 | 6.989 | 9.944 |
| (T) | 10.995 | 2.8 | 3.935 |

$\dfrac{\phi_{123}}{\phi_W} = 1.305, \beta_{2T} \cdot \beta_{3T} = 0.6765$ $\dfrac{\beta_{4T}}{\beta_{4W}} = 1.888$ In respective embodiments shown in the above, reference symbols $r_1, r_2, \ldots$ respectively represent radii od curvature of respective lens surfaces, reference symbols $d_1, d_2, \ldots$ respectively represent thicknesses of respective lens and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective embodiments.

Figure 6:
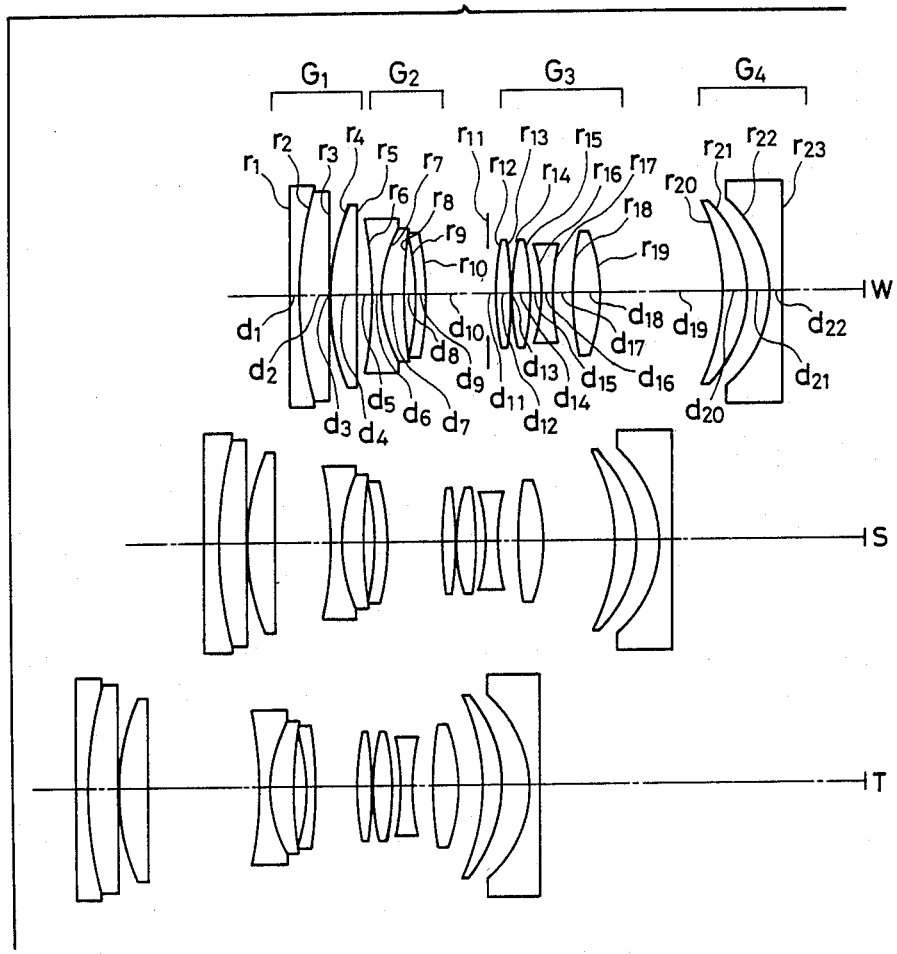
FIG. 6 shows a sectional view of Embodiments 1, 2 and 3 of the zoom lens system according to the present invention.

Out of respective embodiments shown in the above, Embodiments 1, 2 and 3 respectively have the lens configuration as shown in FIG. 6. that is, the first lens group $G_1$ is arranged to comprise a positive cemented doublet, which consists of a negative meniscus lens convex toward the object side and a positive lens cemented together, and a positive lens in the order from the object side. By arranging as above, the refractive power is distributed to respective lenses adequately, and aberrations to be caused by the first lens group $G_1$ are thereby made small. It is also possible to arrange that the first lens group $G_1$ comprises tow lenses. In that case, however, radii of curvature of respective lens surfaces becomes small, and thicknesses of respective lenses become large. Therefore, it is not preferable to do so.

The second lens group $G_2$ is arranged to comprise a negative cemented doublet, which consists of a negative lens and a positive lens cemented together, and a negative meniscus lens in the order from the object side so as to thereby arrange that the front principal point of the lens system comes to a position further put toward the object side so that the overall length of the lens system becomes short. The second lens group $G_2$ serves to correct coma, distortion and astigmatism of the lens system as a whole in well balanced state. For this purpose, the second lens group $G_2$ is arranged that the above-mentioned aberrations are overcorrected by the foremost surface (the surface on the object side) thereof.

The third lens group $G_3$ is arranged to comprise two positive lenses, a negative lens and a positive lens in the order from the object side. As the third lens group $G_3$ is located at a position where the incident heights of paraxial rays become high, the above-mentioned lens configuration is adopted so that the front principal point is put toward the object side so as to thereby correct spherical aberration effectively.

The fourth lens group $G_4$ is arranged to comprise a positive meniscus lens and a negative meniscus lens in the order from the object side, and this contributes to attainment of flatness of image surface. An air lens formed between the two lenses constituting the fourth lens group $G_4$ serves to cause aberrations of higher orders so as to offset aberrations caused by the first lens group $G_1$, second lens group $G_2$ and third lens group $G_3$.

Figure 7:
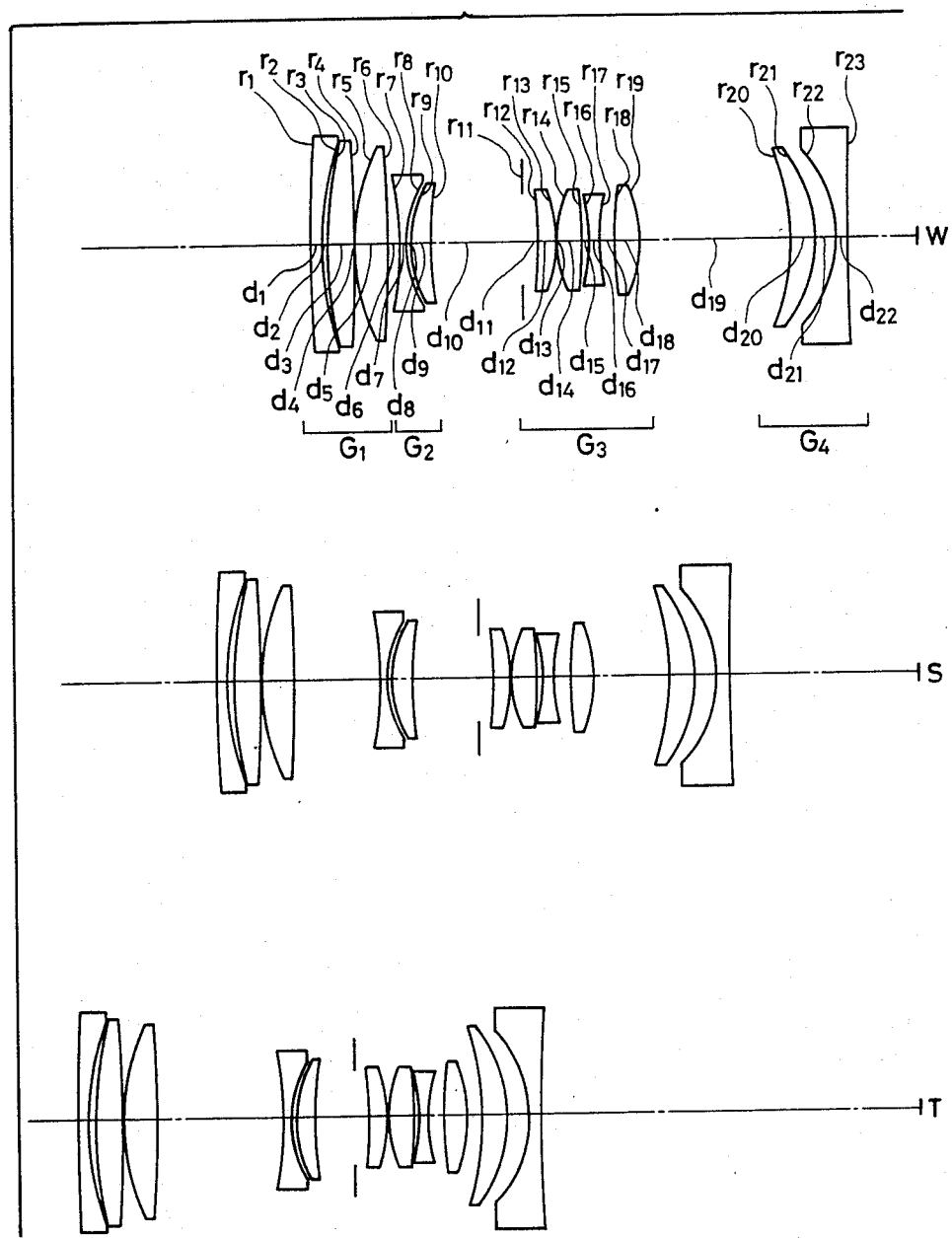
FIG. 7 shows a sectional view of Embodiment 4 of the present invention.

Embodiment 4 has the lens configuration as shown in FIG. 7. That is, Embodiment 4 is arranged that the cemented doublet, which constitutes the first lens group $G_1$ of Embodiments 1, 2 and 3, is separated from each other so that an air lens is formed between the negative meniscus lens and positive lens. That is, the first lens group $G_1$ of Embodiment 4 is arranged to comprise a negative meniscus lens, a positive lens and a positive lens and is thereby arranged to have functions similar to the first lens group of Embodiments 1, 2 and 3. Besides, the second lens group $G_2$ is arranged to comprise two lenses, i.e., a negative lens and a positive lens, by dividing the afore-mentioned cemented doublet. In other words, the second lens group of Embodiment 4 is arranged to comprise a smaller number of lenses compared with the second lens group of Embodiments 1, 2 and 3 and, at the same time, to have functions equivalent to those of the second lens group of Embodiments 1, 2 and 3. The third lens group $G_3$ and fourth lens group $G_4$ are arranged to have lens configurations similar to those of Embodiments 1, 2 and 3.

Figure 5:
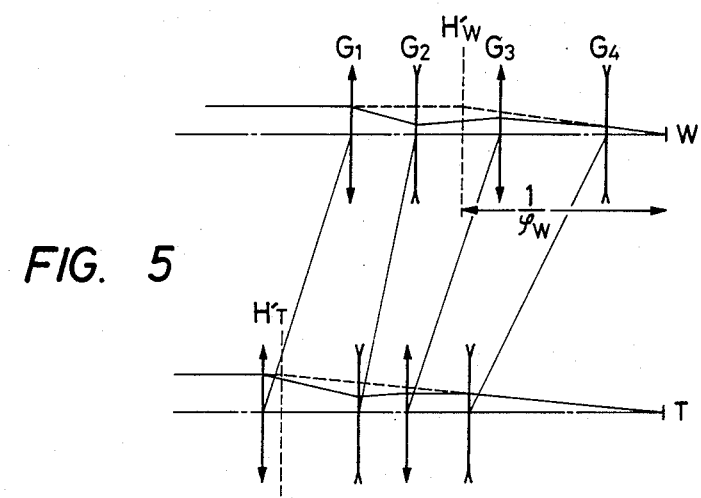

Embodiments 1, 2, 3 and 4 described so far are all arranged that the lens groups thereof are moved as shown in FIG. 5 at the time of zooming. That is, at the time of zooming from the wide position to the teleposition, respective lens groups are individually moved toward the object side independently of each other. Furthermore, Embodiments 1, 2, 3 and 4 are all arranged to fulfill the conditions (1), (2) and (3).

Figure 8:
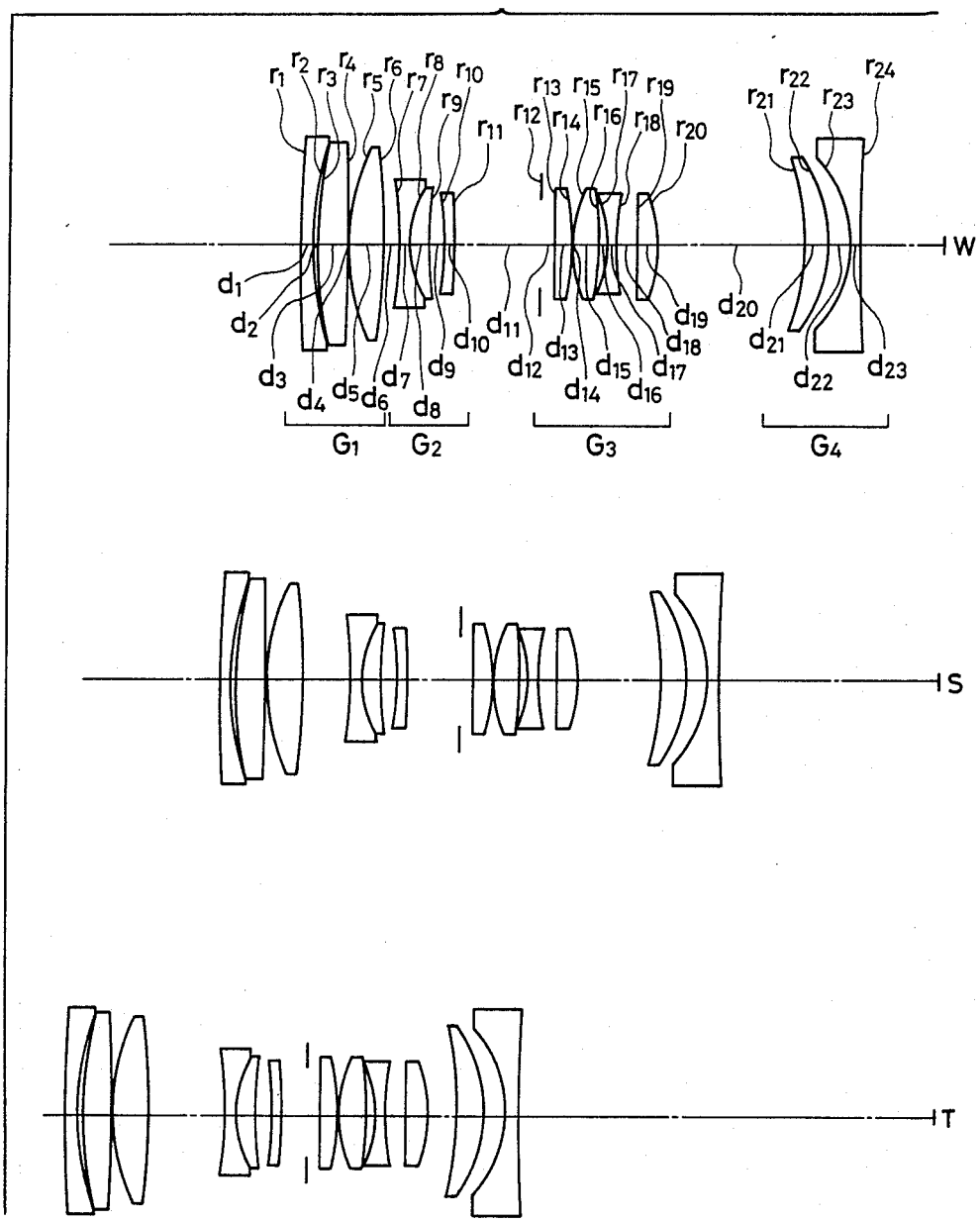
FIG. 8 shows a sectional view of Embodiments 5 and 7 of the present invention.

Embodiments 5 and 7 respectively have the lens configuration as shown in FIG. 8. That is, the first lens group $G_1$ comprises a negative meniscus lens convex toward the object side, a positive lens and a positive lens in the order from the object side, and this resembles the lens configuration of the first lens group of Embodiment 4. The second lens group $G_2$ comprises a cemented doublet and a negative lens in the same way as Embodiments 1, 2 and 3. The third lens group $G_3$ and fourth lens group $G_4$ respectively have lens configurations similar to those of Embodiments 1, 2, 3 and 4.

Figure 9:
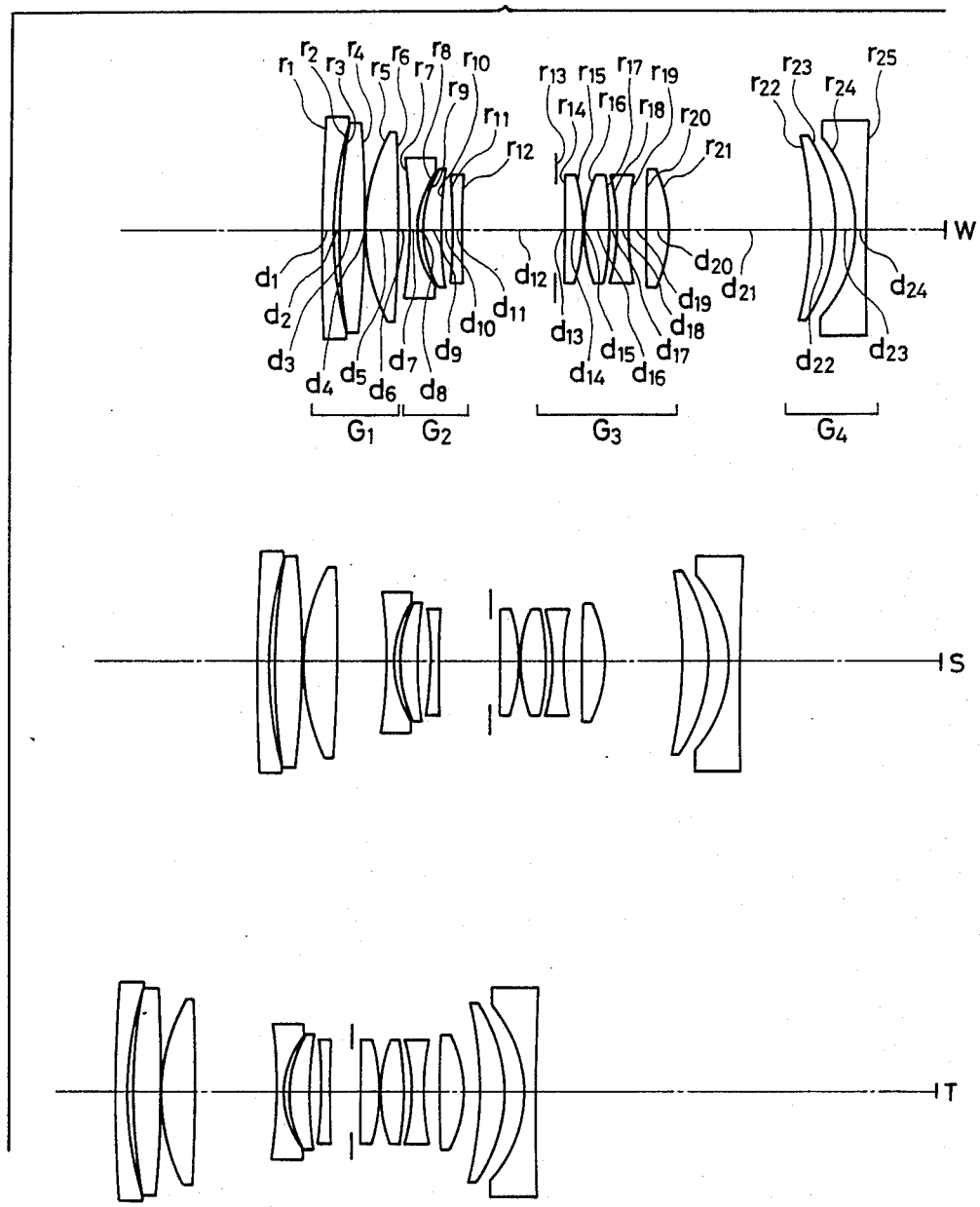
FIG. 9 shows a sectional view of Embodiment 6 of the present invention.
Figure 10:
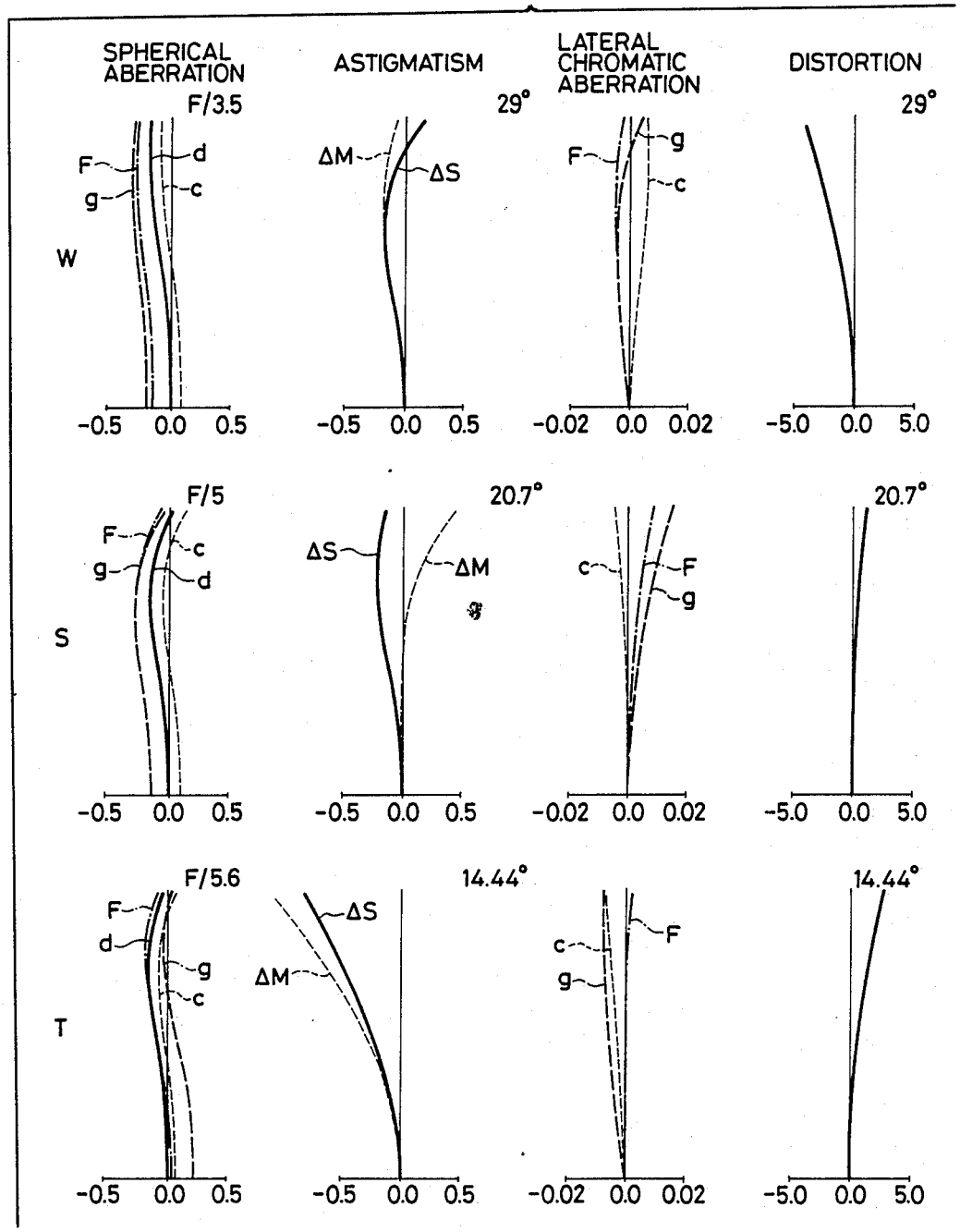
FIG. 10 shows graphs illustrating aberration curves of Embodiment 1 of the present invention.
Figure 11:
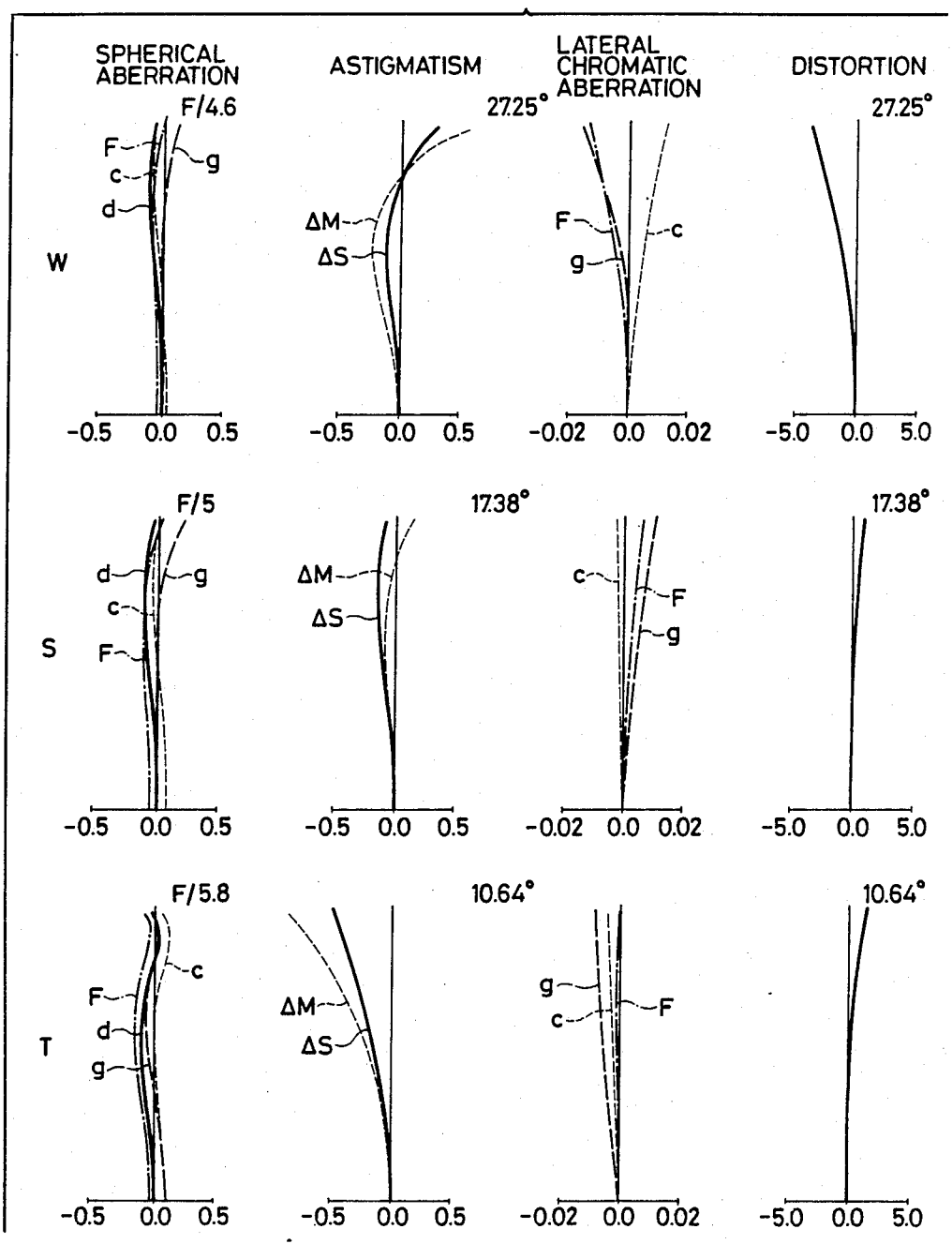
FIG. 11 show graphs illustrating aberration curves of Embodiment 2 of the present invention.
Figure 12:
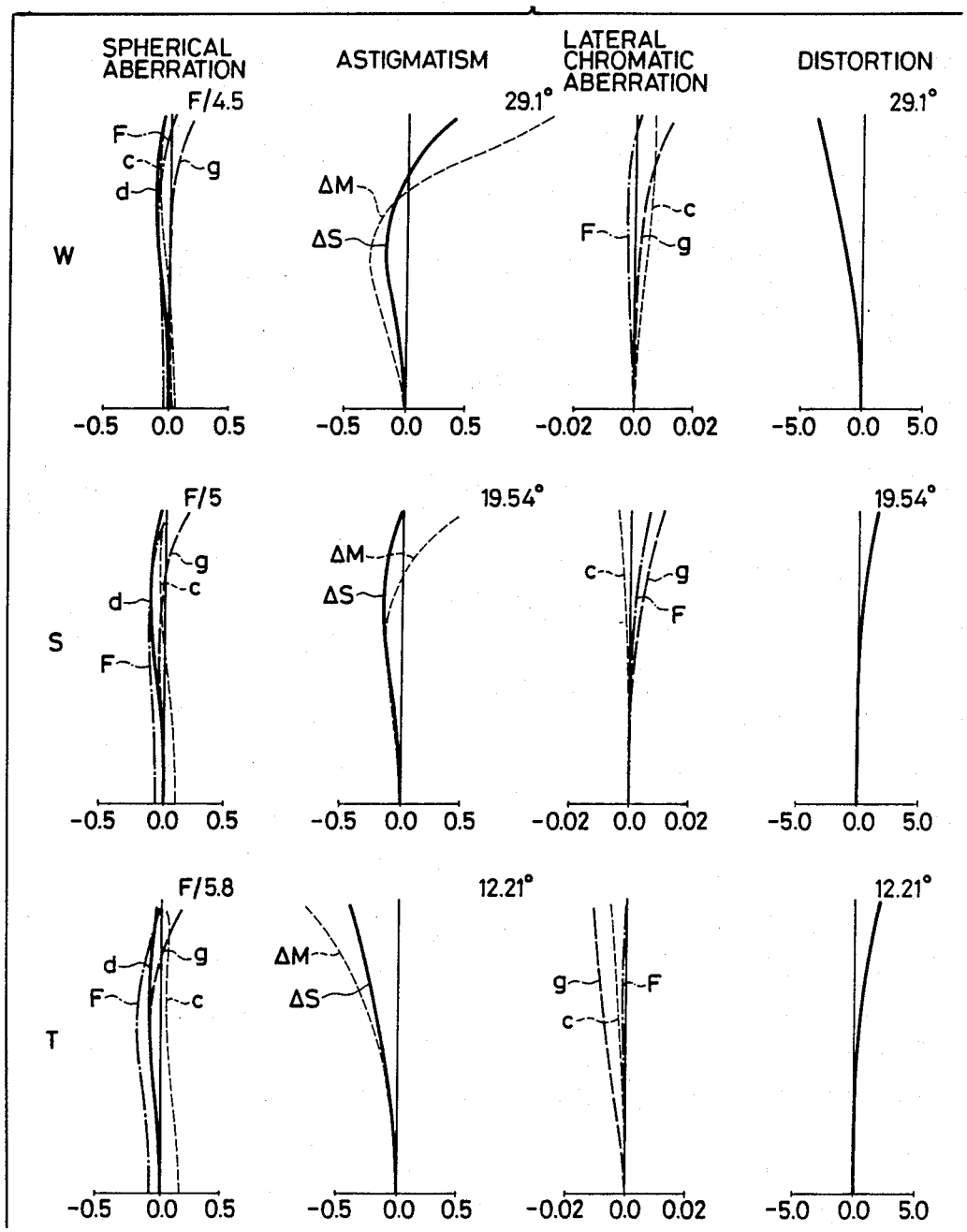
FIG. 12 shows graphs illustrating aberration curves of Embodiment 3 of the present invention.
Figure 13:
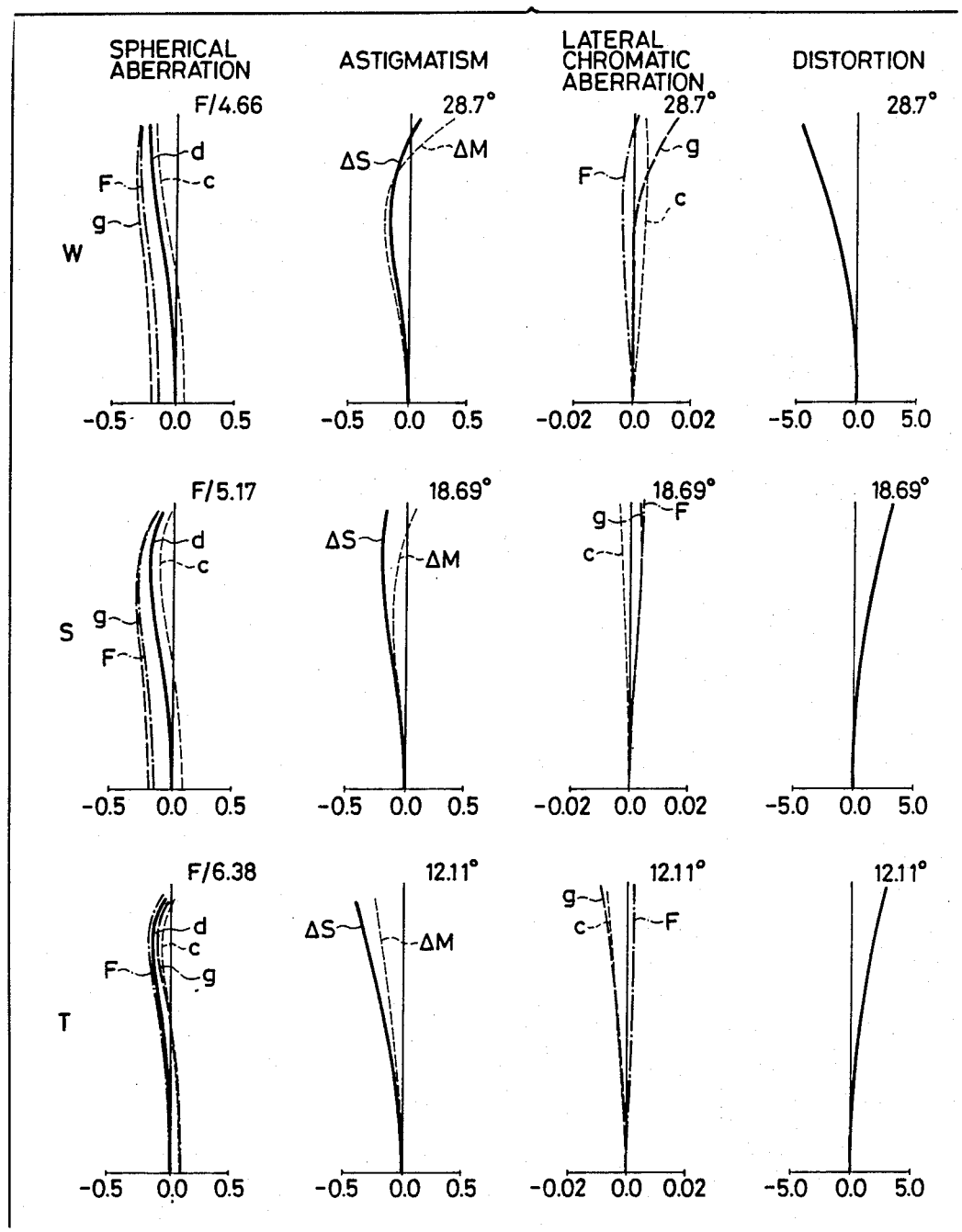
FIG. 13 shows graphs illustrating aberration curves of Embodiment 4 of the present invention.
Figure 14:
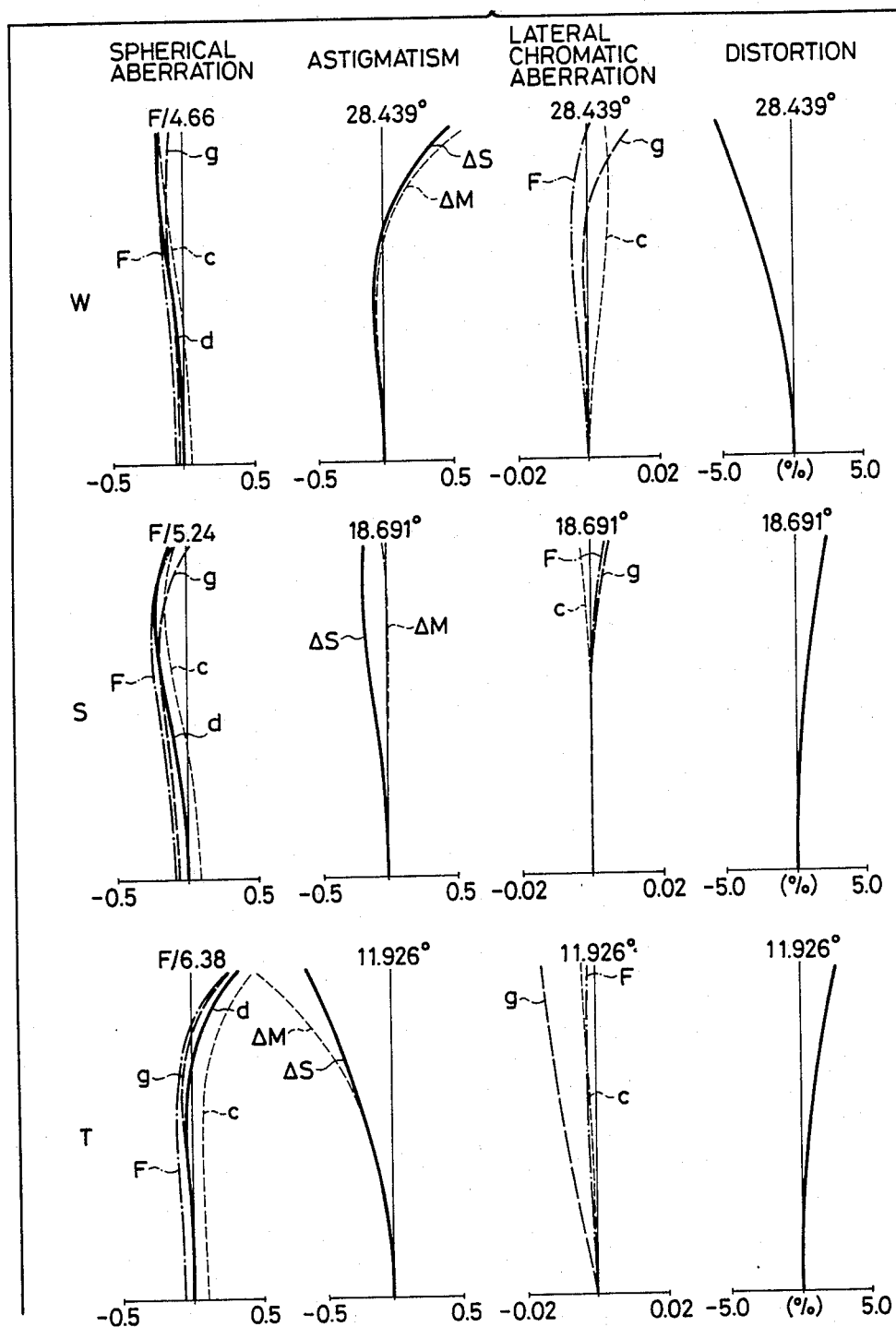
FIG. 14 shows graphs illustrating aberration curves of Embodiment 5 of the present invention.
Figure 15:
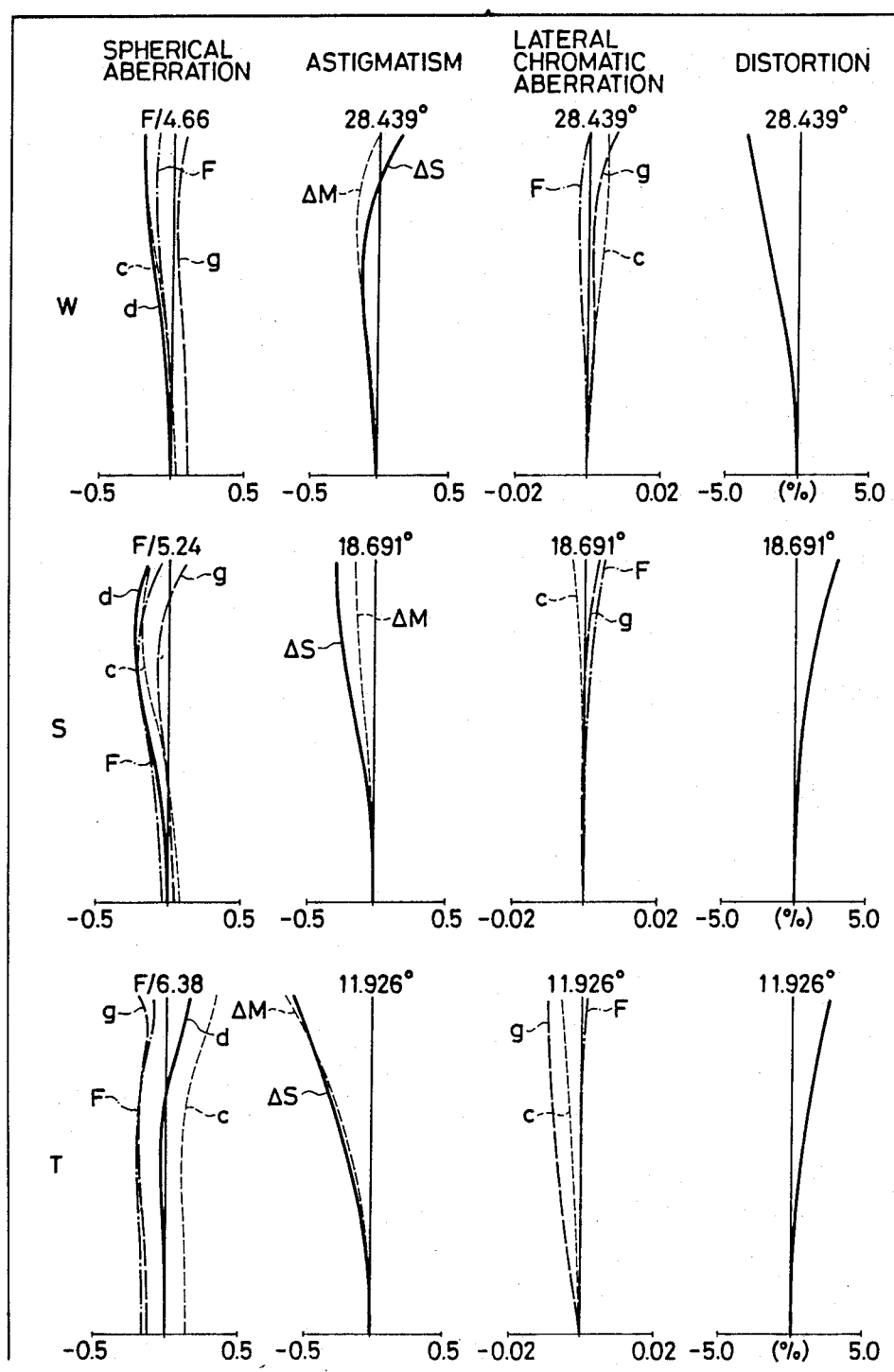
FIG. 15 shows graphs illustrating aberration curves of Embodiment 6 of the present invention.
Figure 16:
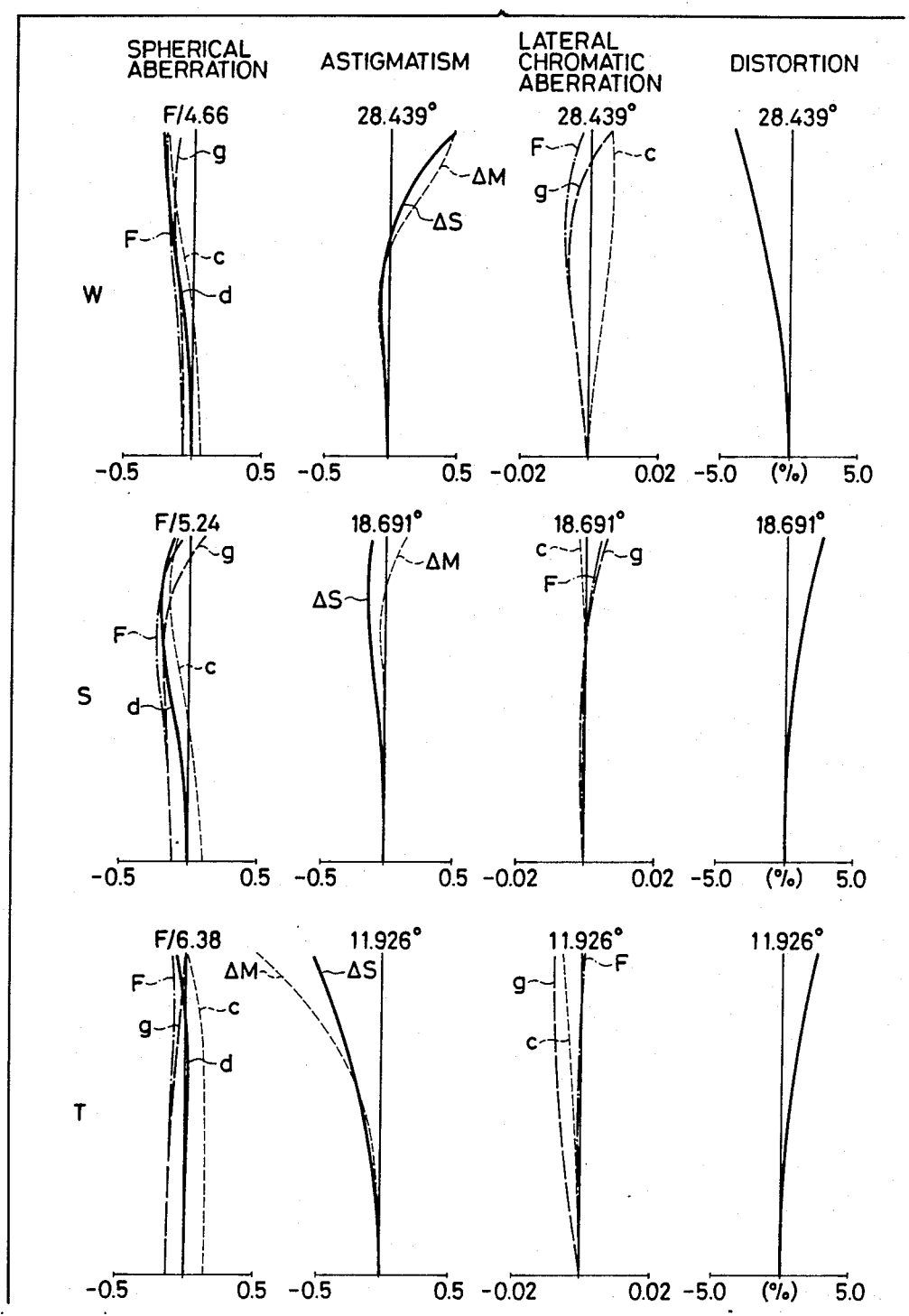
FIG. 16 shows graphs illustrating aberration curves of Embodiment 7 of the present invention.

Embodiment 6 has the lens configuration as shown in FIG. 9. In said embodiment 6, the second lens group $G_2$ is arranged to comprise a negative lens, a positive lens and a negative lens by dividing the cemented doublet described before. As the cemented doublet is divided as mentioned in the above, the degree of freedom for correction of aberrations is increased, and the afore-mentioned coma, distortion and astigmatism of the lens system as a whole are thereby corrected in more favourably balanced state.

Furthermore, in Embodiment 6, the first lens group $G_1$ is arranged to have a lens configuration similar to that of Embodiments 4, 5 and 7, and the third lens group $G_3$ and fourth lens group $G_4$ are arranged to have a lens configuration similar to those of the other embodiments, i.e., Embodiments 1 through 5 and Embodiment 7.

Embodiments 5, 6 and 7 described so far are respectively arranged that the first lens group $G_1$ and third lens groups $G_3$ are moved integrally with each other as shown in FIg. 6 at the time of zooming. Besides, Embodiments 5, 6 and 7 are respectively arranged to fulfill the conditions (4), (5) and (6).

Aberration curves of Embodiments 1 through 7 are respectively shown in FIGS. 10 through 16. In said figures, reference symbol (W) represents aberration curves in the wide position, reference symbol (S) represents aberration curves in the position of the intermediate focal length, and reference symbol (T) represents aberration curves in the teleposition.

As described so far, the compact high vari-focal ratio zoom lens system according to the present invention is arranged to have a high vari-focal ratio about 2 to 3, which is not attained by any of known zoom lens systems for a camera with a lens shutter, and is arranged to be small in size and light in weight and to have favourable performance over the whole vari-focal range. Besides, when the zoom lens system according to the present invention is arranged to integrally move the first lens group $G_1$ and third lens group $G_3$ at the time of zooming as illustrated by Embodiments 5, 6 and 7, it is possible to simplify the lens mount and to thereby reduce the cumulative error to be caused in the assembly process.

I claim:

1. A compact high vari-focal ratio zoom lens system comprising a first lens group having positive refractive power, a second lens group having negative refractive power, a third lens group having positive refractive power, and a fourth lens group having negative refractive power, in the order from the object side, and arranged to move said first, second, third and fourth lens groups respectively toward the object side along the optical axis at the time of zooming from the wide position to the teleposition, said compact high-vari-focal ratio zoom lens system being arranged to fulfill the conditions (1), (2) and (3) shown below:

$$0.03 < \frac{\beta_{4T}}{\beta_{4W}} \cdot \phi_W < 0.07 \quad (1)$$

$$0.3 < \beta_{2T} \cdot \beta_{3T} < 1.0 \quad (2)$$

$$5 < \frac{1 - \beta_{4W}}{\phi_4} < 20 \quad (3)$$

where, reference symbol $\beta_{2T}$ represents the lateral magnification of the second lens group in the teleposition, reference symbol $\beta_{3T}$ represents the lateral magnification of the third lens group in the teleposition, reference symbol $\beta_{4T}$ represents the lateral magnification of the fourth lens group in the teleposition, reference symbol $\beta_{4W}$ represents the lateral magnification of the fourth lens group in the wide position, reference symbol $\phi_W$ represents the refractive power of the lens system as a whole in the wide position, and reference symbol $\phi_4$ represents the refractive power of the fourth lens group.

2. A compact high vari-focal ratio zoom lens system according to claim 1 wherein said first lens group comprises a negative lens and at least one positive lens, said second lens group comprises a positive lens and at least one negative lens, said third lens group comprises at least two positive lenses and a negative lens, and said fourth lens group comprises a positive lens and a negative lens.

3. A compact high vari-focal ratio zoom lens system according to claim 2 wherein said first lens group comprises a cemented doublet, which consists of a negative meniscus lens convex toward the object side and a positive lens cemented together, and a positive lens in the order from the object side, said second lens groups comprises a cemented doublet, which consists of a negative lens and a positive lens cemented together, and a negative meniscus lens in the order from the object side, said third lens group comprises two positive lenses, a negative lens, and a positive lens in the order from the object side, and said fourth lens group comprises a positive meniscus lens, and a negative meniscus lens in the order from the object side.

4. A compact high vari-focal rati zoom lens system according to claim 2 wherein said first lens group comprises a negative meniscus lens convex toward the object side, a positive lens, and a positive lens in the order from the object side, said second lens group comprises a negative lens, and a positive lens in the order from the object side, said third lens group comprises two positive lenses, a negative lens, and a positive lens in the order from the object side, and said fourth lens group comprises a positive meniscus lens, and a negative mensicus lens in the order from the object side.

5. A compact high vari-focal ratio zoom lens system according to claim 4 wherein said second lens group is provided with an aspherical surface expressed by the formula shown below when the x axis is traced in the direction of the optical axis, the y axis is traced in the direction perpendicular to the optical axis, and the radius of curvature of the vertex portion of said aspherical surface is represented by reference symbol $r_k$:

$$x_k = \frac{y^2_k}{r_k + r_k \sqrt{1 - (y_k/r_k)^2}} + A_k y^4_k + B_k y^6_k + C_k y^8_k + D_k y^{10}_k$$

where, reference symbols $A_k$, $B_k$, $C_k$ and $D_k$ respectively represent the coefficients of aspherical surface.

6. A compact high vari-focal ratio zoom lens system according to claim 3 having the following numerical data:

| f = 39.03~84.0, | F/4.5~5.6 | | |
|---|---|---|---|
| $r_1 = 1000.000$ | | | |
| | $d_1 = 1.500$ | $n_1 = 1.84666$ | $\nu_1 = 23.88$ |
| $r_2 = 54.037$ | | | |
| | $d_2 = 3.500$ | $n_2 = 1.69680$ | $\nu_2 = 55.52$ |
| $r_3 = 685.901$ | | | |
| | $d_3 = 0.150$ | | |
| $r_4 = 30.109$ | | | |
| | $d_4 = 3.600$ | $n_3 = 1.51741$ | $\nu_3 = 49.21$ |
| $r_5 = -735.755$ | | | |
| | $d_5 = l_1$ | | |
| $r_6 = -49.662$ | | | |
| | $d_6 = 1.219$ | $n_4 = 1.77250$ | $\nu_4 = 49.66$ |
| $r_7 = 19.014$ | | | |
| | $d_7 = 3.001$ | $n_5 = 1.80518$ | $\nu_5 = 25.43$ |
| $r_8 = 94.078$ | | | |

-continued

| f = 39.03~84.0, | F/4.5~5.6 | | |
|---|---|---|---|
| | $d_8 = 1.292$ | | |
| $r_9 = -26.594$ | | | |
| | $d_9 = 1.180$ | $n_6 = 1.72916$ | $v_6 = 54.68$ |
| $r_{10} = -46.031$ | | | |
| | $d_{10} = l_2$ | | |
| $r_{11} = \infty$ (stop) | | | |
| | $d_{11} = 2.000$ | | |
| $r_{12} = 39.181$ | | | |
| | $d_{12} = 1.708$ | $n_7 = 1.67607$ | $v_7 = 48.71$ |
| $r_{13} = -46.680$ | | | |
| | $d_{13} = 0.150$ | | |
| $r_{14} = 23.666$ | | | |
| | $d_{14} = 2.521$ | $n_8 = 1.58144$ | $v_8 = 40.75$ |
| $r_{15} = -30.712$ | | | |
| | $d_{15} = 0.941$ | | |
| $r_{16} = -21.719$ | | | |
| | $d_{16} = 1.603$ | $n_9 = 1.80518$ | $v_9 = 25.43$ |
| $r_{17} = 24.143$ | | | |
| | $d_{17} = 2.484$ | | |
| $r_{18} = 45.176$ | | | |
| | $d_{18} = 3.266$ | $n_{10} = 1.56732$ | $v_{10} = 42.83$ |
| $r_{19} = -21.874$ | | | |
| | $d_{19} = l_3$ | | |
| $r_{20} = -26.797$ | | | |
| | $d_{20} = 2.720$ | $n_{11} = 1.68893$ | $v_{11} = 31.08$ |
| $r_{21} = -16.928$ | | | |
| | $d_{21} = 3.000$ | | |
| $r_{22} = -15.303$ | | | |
| | $d_{22} = 1.295$ | $n_{12} = 1.77250$ | $v_{12} = 49.66$ |
| $r_{23} = -510.056$ | | | |
| | $l_1$ | $l_2$ | $l_3$ |
| (W) | 1.55 | 6.568 | 13.44 |
| (S) | 6.817 | 5.252 | 3.306 |
| (T) | 15.018 | 8.553 | 3.116 |

$$\frac{\beta_{4T}}{\beta_{4W}} \cdot \phi_W = 0.043, \quad \beta_{2T} \cdot \beta_{3T} = 0.55$$

$$\frac{1 - \beta_{4W}}{\phi_4} = 10.43$$

where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $v_1$, $v_2$, ... respectively represent Abbe's numbers of respective embodiments.

7. A compact high vari-focal ratio zoom lens system according to claim 5 having the following umerical data:

| f = 41.8~115.2, | F/4.6~5.8 | | |
|---|---|---|---|
| $r_1 = 576.703$ | | | |
| | $d_1 = 1.250$ | $n_1 = 1.84666$ | $v_1 = 23.88$ |
| $r_2 = 52.295$ | | | |
| | $d_2 = 3.334$ | $n_2 = 1.69680$ | $v_2 = 55.52$ |
| $r_3 = 315.082$ | | | |
| | $d_3 = 0.044$ | | |
| $r_4 = 34.136$ | | | |
| | $d_4 = 3.503$ | $n_3 = 1.51733$ | $v_3 = 49.21$ |
| $r_5 = -145.821$ | | | |
| | $d_5 = l_1$ | | |
| $r_6 = -46.750$ | | | |
| | $d_6 = 1.180$ | $n_4 = 1.77250$ | $v_4 = 49.66$ |
| $r_7 = 15.696$ | | | |
| | $d_7 = 2.931$ | $n_5 = 1.80518$ | $v_5 = 25.43$ |
| $r_8 = 57.301$ | | | |
| | $d_8 = 2.000$ | | |
| $r_9 = -38.594$ | | | |
| | $d_9 = 1.141$ | $n_6 = 1.72916$ | $v_6 = 54.68$ |
| $r_{10} = -54.320$ | | | |
| | $d_{10} = l_2$ | | |
| $r_{11} = \infty$ (stop) | | | |

-continued

| f = 41.8~115.2, | F/4.6~5.8 | | |
|---|---|---|---|
| | $d_{11} = 1.950$ | | |
| $r_{12} = 133.176$ | | | |
| | $d_{12} = 2.650$ | $n_7 = 1.67603$ | $v_7 = 38.63$ |
| $r_{13} = -41.274$ | | | |
| | $d_{13} = 0.165$ | | |
| $r_{14} = 16.466$ | | | |
| | $d_{14} = 3.500$ | $n_8 = 1.57863$ | $v_8 = 58.93$ |
| $r_{15} = -123.275$ | | | |
| | $d_{15} = 0.940$ | | |
| $r_{16} = -46.483$ | | | |
| | $d_{16} = 1.649$ | $n_9 = 1.80518$ | $v_9 = 25.43$ |
| $r_{17} = 18.973$ | | | |
| | $d_{17} = 2.409$ | | |
| $r_{18} = 42.751$ | | | |
| | $d_{18} = 3.296$ | $n_{10} = 1.56732$ | $v_{10} = 42.83$ |
| $r_{19} = -28.426$ | | | |
| | $d_{19} = l_3$ | | |
| $r_{20} = -32.306$ | | | |
| | $d_{20} = 4.000$ | $n_{11} = 1.78472$ | $v_{11} = 25.68$ |
| $r_{21} = -19.556$ | | | |
| | $d_{21} = 2.998$ | | |
| $r_{22} = -17.373$ | | | |
| | $d_{22} = 1.288$ | $n_{12} = 1.77250$ | $v_{12} = 49.66$ |
| $r_{23} = -465.852$ | | | |
| | $l_1$ | $l_2$ | $l_3$ |
| (W) | 0.879 | 9.411 | 22.545 |
| (S) | 5.42 | 7.473 | 10.934 |
| (T) | 11.495 | 5.293 | 2.221 |

$$\frac{\beta_{4T}}{\beta_{4W}} \cdot \phi_W = 0.052, \quad \beta_{2T} \cdot \beta_{3T} = 0.648$$

$$\frac{1 - \beta_{4W}}{\phi_4} = 8.8$$

where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $v_1$, $v_2$, ... respectively represent Abbe's numbers of respective embodiments.

8. A compact high vari-focal ratio zoom lens system according to claim 3 having the following numerical data:

| f = 39.5~100.8, | F/4.5~5.8 | | |
|---|---|---|---|
| $r_1 = 704.210$ | | | |
| | $d_1 = 1.034$ | $n_1 = 1.84666$ | $v_1 = 23.88$ |
| $r_2 = 55.010$ | | | |
| | $d_2 = 2.914$ | $n_2 = 1.69100$ | $v_2 = 54.84$ |
| $r_3 = 483.967$ | | | |
| | $d_3 = 0.048$ | | |
| $r_4 = 39.471$ | | | |
| | $d_4 = 3.279$ | $n_3 = 1.53172$ | $v_3 = 48.90$ |
| $r_5 = -144.953$ | | | |
| | $d_5 = l_1$ | | |
| $r_6 = -38.351$ | | | |
| | $d_6 = 1.142$ | $n_4 = 1.78650$ | $v_4 = 50.00$ |
| $r_7 = 15.821$ | | | |
| | $d_7 = 2.882$ | $n_5 = 1.80518$ | $v_5 = 25.43$ |
| $r_8 = 60.536$ | | | |
| | $d_8 = 1.970$ | | |
| $r_9 = -41.166$ | | | |
| | $d_9 = 1.139$ | $n_6 = 1.72600$ | $v_6 = 53.56$ |
| $r_{10} = -44.549$ | | | |
| | $d_{10} = l_2$ | | |
| $r_{11} = \infty$ (stop) | | | |
| | $d_{11} = 1.936$ | | |
| $r_{12} = 113.494$ | | | |
| | $d_{12} = 2.601$ | $n_7 = 1.66998$ | $v_7 = 39.27$ |
| $r_{13} = -40.273$ | | | |
| | $d_{13} = 0.080$ | | |
| $r_{14} = 15.651$ | | | |

-continued f = 39.5~100.8,   F/4.5~5.8

| | | | |
|---|---|---|---|
| $r_{15} = -84.039$ | | | |
| | $d_{14} = 3.500$ | $n_8 = 1.57250$ | $v_8 = 57.76$ |
| $r_{16} = -43.748$ | $d_{15} = 0.940$ | | |
| | $d_{16} = 1.666$ | $n_9 = 1.80518$ | $v_9 = 25.43$ |
| $r_{17} = 17.703$ | | | |
| | $d_{17} = 2.414$ | | |
| $r_{18} = 41.785$ | | | |
| | $d_{18} = 3.310$ | $n_{10} = 1.56732$ | $v_{10} = 42.83$ |
| $r_{19} = -28.109$ | | | |
| | $d_{19} = l_3$ | | |
| $r_{20} = -36.261$ | | | |
| | $d_{20} = 3.907$ | $n_{11} = 1.76182$ | $v_{11} = 26.52$ |
| $r_{21} = -19.227$ | | | |
| | $d_{21} = 3.003$ | | |
| $r_{22} = -16.570$ | | | |
| | $d_{22} = 1.196$ | $n_{12} = 1.78650$ | $v_{12} = 50.00$ |
| $r_{23} = -7206.869$ | | | |
| | $l_1$ | $l_2$ | $l_3$ |
| (W) | 0.649 | 6.461 | 13.086 |
| (S) | 9.397 | 7.647 | 5.53 |
| (T) | 19.718 | 10.224 | 2.222 |

$$\frac{\beta_{4T}}{\beta_{4W}} \cdot \phi_W = 0.052, \quad \beta_{2T} \cdot \beta_{3T} = 0.568$$

$$\frac{1 - \beta_{4W}}{\phi_4} = 8.86$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $v_1, v_2, \ldots$ respectively represent Abbe's numbers of respective embodiments.

9. A compact high vari-focal ratio zoom lens system according to claim 5 having the following numerical data:

f = 39.5~100.8,   F/4.66~6.38

| | | | |
|---|---|---|---|
| $r_1 = 349.9503$ | | | |
| | $d_1 = 1.5000$ | $n_1 = 1.80518$ | $v_1 = 25.43$ |
| $r_2 = 42.1930$ | | | |
| | $d_2 = 1.0973$ | $n_2 = 1.63854$ | $v_2 = 55.38$ |
| $r_3 = 70.9524$ | | | |
| | $d_3 = 3.5700$ | | |
| $r_4 = -382.0492$ | | | |
| | $d_4 = 0.2000$ | | |
| $r_5 = 32.5644$ | | | |
| | $d_5 = 4.5000$ | $n_3 = 1.54814$ | $v_3 = 45.78$ |
| $r_6 = -220.5084$ | | | |
| | $d_6 = l_1$ | | |
| $r_7 = -47.9514$ | | | |
| | $d_7 = 1.2622$ | $n_4 = 1.73500$ | $v_4 = 49.82$ |
| $r_8 = 16.4175$ | | | |
| | $d_8 = 0.6324$ | | |
| $r_9 = 18.1342$ | | | |
| | $d_9 = 2.7671$ | $n_5 = 1.80518$ | $v_5 = 25.43$ |
| $r_{10} = 60.3650$ | (aspherical surface) | | |
| | $d_{10} = l_2$ | | |
| $r_{11} = \infty$ (stop) | | | |
| | $d_{11} = 2.3500$ | | |
| $r_{12} = -80.2003$ | | | |
| | $d_{12} = 2.6000$ | $n_6 = 1.62374$ | $v_6 = 47.10$ |
| $r_{13} = -23.3793$ | | | |
| | $d_{13} = 0.1624$ | | |
| $r_{14} = 18.1182$ | | | |
| | $d_{14} = 3.4320$ | $n_7 = 1.56873$ | $v_7 = 63.16$ |
| $r_{15} = -82.4988$ | | | |
| | $d_{15} = 0.8538$ | | |
| $r_{16} = -28.6287$ | | | |
| | $d_{16} = 1.6178$ | $n_8 = 1.80610$ | $v_8 = 33.27$ |
| $r_{17} = 26.6319$ | | | |

-continued f = 39.5~100.8,   F/4.66~6.38

| | | | |
|---|---|---|---|
| | $d_{17} = 2.1808$ | | |
| $r_{18} = 87.2734$ | | | |
| | $d_{18} = 3.2322$ | $n_9 = 1.56873$ | $v_9 = 63.16$ |
| $r_{19} = -20.1861$ | | | |
| | $d_{19} = l_3$ | | |
| $r_{20} = -38.1009$ | | | |
| | $d_{20} = 3.6500$ | $n_{10} = 1.74950$ | $v_{10} = 35.27$ |
| $r_{21} = -20.1587$ | | | |
| | $d_{21} = 2.9373$ | | |
| $r_{22} = -18.0802$ | | | |
| | $d_{22} = 1.6014$ | $n_{11} = 1.77250$ | $v_{11} = 49.66$ |
| $r_{23} = 418.7028$ | | | | aspherical surface coefficients
$A_{10} = -0.20573 \times 10^{-6}$   $B_{10} = -0.17169 \times 10^{-7}$
$C_{10} = -0.16365 \times 10^{-10}$   $D_{10} = 0.55883 \times 10^{-11}$

| | $l_1$ | $l_2$ | $l_3$ |
|---|---|---|---|
| (W) | 1.709 | 12.442 | 20.452 |
| (S) | 12.374 | 8.970 | 10.339 |
| (T) | 17.912 | 5.302 | 2.027 |

$$\frac{\beta_{4T}}{\beta_{4W}} \cdot \phi_W = 0.047, \quad \beta_{2T} \cdot \beta_{3T} = 0.608$$

$$\frac{1 - \beta_{4W}}{\phi_4} = 9.86$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $v_1, v_2, \ldots$ respectively represent Abbe's numbers of respective embodiments.

10. A compact high vari-focal ratio zoom lens system comprising a first lens group having positive refractive power, a second lens group having negative refractive power, a third lens group having positive refractive power, and a fourth lens group having negative refractive power, in the order from the object side, and arranged to move said first, second, third and fourth lens groups respectively toward the object side along the optical axis at the time of zooming from the wide position to the teleposition, said compact high vari-focal ratio zoom lens system being arranged to move said first and third lens groups integrally with each other when moving said lens groups and arranged to fulfill the conditions (4), (5) and (6) shown below:

$$0.8 < \frac{\phi_{123W}}{\phi_W} < 1.6 \quad (4)$$

$$0.3 < \beta_{2T} \cdot \beta_{3T} < 1.0 \quad (5)$$

$$1.1 < \frac{\beta_{4T}}{\beta_{4W}} < 2.8 \quad (6)$$

where, reference symbol $\phi_{123W}$ represents the total refractive power of the first, second and third lens groups in the wide position, reference symbol $\phi_W$ represents the total refractive power of the lens system as a whole in the wide position, reference symbol $\beta_{2T}$ represents the lateral magnification of the second lens group in the teleposition, reference symbol $\beta_{3T}$ represents the lateral magnification of the third lens group in the teleposition, reference symbol $\beta_{4W}$ represents the lateral magnification of the fourth lens group in the wide position, and reference symbol $\beta_{4T}$ represents the lateral magnification of the fourth lens group in the teleposition.

11. A compact high vari-focal ratio zoom lens system according to claim 10 wherein said first lens group comprises a negative lens and at least one positive lens, said second lens group comprises a positive lens and a negative lens, said third lens group comprises at least two positive lenses and a negative lens, and said fourth lens group comprises a positive lens and a negative lens.

12. A compact high vari-focal ratio zoom lens system according to claim 11 wherein said first lens group comprises a negative meniscus lens convex toward the object side, a positive lens, and a positive lens in the order from the object side, said second lens group comprises a cemented doublet, which consists of a negative lens and a positive lens cemented together, and a negative lens in the order from the object side, said third lens group comprises two positive lenses, a negative lens and a positive lens in the order from the object side, and said fourth lens group comprises a positive meniscus lens, and a negative meniscus lens in the order from the object side.

13. A compact high vari-focal ratio zoom lens system according to claim 11 wherein said first lens group comprises a negative meniscus lens convex toward the object side, a positive lens, and a positive lens in the order from the object side, said second lens group comprises a negative lens, a positive lens, and a negative lens in the order from the object side, said third lens group comprises two positive lenses, a negative lens, and a positive lens in the order from the object side, and aid fourth lens group comprises a positive meniscus lens, and a negative meniscus lens in the order from the object side.

14. A compact high vari-focal ratio zoom lens system according to claim 12 wherein said fourth lens group is provided with an aspherical surface expressed by the formula shown below when the x axis is traced in the direction of the optical axis, the y axis is traced in the direction perpendicular to the optical axis, and the radius of curvature of the vertex portion of said aspherical surface is represented by reference symbol $r_k$:

$$x_k = \frac{y^2{}_k}{r_k + r_k\sqrt{1 - (y_k/r_k)^2}} + A_k y^4{}_k + B_k y^6{}_k + C_k y^8{}_k + D_k y^{10}{}_k$$

where, reference symbols $A_k$, $B_k$, $C_k$ and $D_k$ respectively represent the coefficients of aspherical surface.

15. A compact high vari-focal ratio zoom lens system according to claim 7 having the following numerical data:

| f = 39.946~102.429, F/4.66~6.38 2ω = 56.877°~23.851° | | | |
|---|---|---|---|
| $r_1 = 348.9483$ | | | |
| | $d_1 = 1.5000$ | $n_1 = 1.84666$ | $\nu_1 = 23.88$ |
| $r_2 = 44.3968$ | | | |
| | $d_2 = 0.8800$ | | |
| $r_3 = 62.5952$ | | | |
| | $d_3 = 3.5700$ | $n_2 = 1.69680$ | $\nu_2 = 55.52$ |
| $r_4 = -3799.1113$ | | | |
| | $d_4 = 0.2000$ | | |
| $r_5 = 30.0416$ | | | |
| | $d_5 = 4.5000$ | $n_3 = 1.53358$ | $\nu_3 = 51.56$ |
| $r_6 = -151.7917$ | | | |
| | $d_6 = l_1$ | | |
| $r_7 = -58.1221$ | | | |

-continued

| | | | |
|---|---|---|---|
| $r_8 = 14.6035$ | $d_7 = 1.3000$ | $n_4 = 1.77250$ | $\nu_4 = 49.66$ |
| | $d_8 = 2.8500$ | $n_5 = 1.80518$ | $\nu_5 = 25.43$ |
| $r_9 = 70.0508$ | | | |
| | $d_9 = 1.9000$ | | |
| $r_{10} = -42.0914$ | | | |
| | $d_{10} = 1.3000$ | $n_6 = 1.72916$ | $\nu_6 = 54.68$ |
| $r_{11} = -211.0582$ | | | |
| | $d_{11} = l_2$ | | |
| $r_{12} = \infty$ (stop) | | | |
| | $d_{12} = 1.9126$ | | |
| $r_{13} = 464.2233$ | | | |
| | $d_{13} = 2.5985$ | $n_7 = 1.63930$ | $\nu_7 = 44.88$ |
| $r_{14} = -28.1184$ | | | |
| | $d_{14} = 0.1624$ | | |
| $r_{15} = 20.4165$ | | | |
| | $d_{15} = 3.4320$ | $n_8 = 1.56873$ | $\nu_8 = 63.16$ |
| $r_{16} = -70.3713$ | | | |
| | $d_{16} = 1.1513$ | | |
| $r_{17} = -23.5502$ | | | |
| | $d_{17} = 1.6178$ | $n_9 = 1.80518$ | $\nu_9 = 25.43$ |
| $r_{18} = 39.3683$ | | | |
| | $d_{18} = 2.3623$ | | |
| $r_{19} = 227.2457$ | | | |
| | $d_{19} = 3.2322$ | $n_{10} = 1.56444$ | $\nu_{10} = 43.78$ |
| $r_{20} = -18.6168$ | | | |
| | $d_{20} = l_3$ | | |
| $r_{21} = -46.0692$ | | | |
| | $d_{21} = 3.6500$ | $n_{11} = 1.78470$ | $\nu_{11} = 26.30$ |
| $r_{22} = -21.2145$ | | | |
| | $d_{22} = 2.6559$ | | |
| $r_{23} = -17.1771$ | | | |
| | $d_{23} = 1.6014$ | $n_{12} = 1.78590$ | $\nu_{12} = 44.18$ |
| $r_{24} = 421.0666$ | | | |

| | $l_1$ | $l_2$ | $l_3$ |
|---|---|---|---|
| (W) | 2.237 | 11.564 | 19.142 |
| (S) | 6.756 | 7.045 | 11.05 |
| (T) | 10.802 | 2.999 | 4.1 |

$$\frac{\phi_{123}}{\phi_W} = 1.2707, \beta_{2T} \cdot \beta_{3T} = 0.7108$$

$$\frac{\beta_{4T}}{\beta_{4W}} = 1.874$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective embodiments.

16. A compact high vari-focal ratio zoom lens system according to claim 8 having the following numerical data:

| f = 39.945~102.429 F/4.66~6.38 2ω = 56.877°~23.851° | | | |
|---|---|---|---|
| $r_1 = 348.7083$ | | | |
| | $d_1 = 1.5000$ | $n_1 = 1.84666$ | $\nu_1 = 23.88$ |
| $r_2 = 49.8456$ | | | |
| | $d_2 = 0.8800$ | | |
| $r_3 = 101.8490$ | | | |
| | $d_3 = 3.5700$ | $n_2 = 1.69600$ | $\nu_2 = 56.49$ |
| $r_4 = -205.0830$ | | | |
| | $d_4 = 0.2000$ | | |
| $r_5 = 27.8469$ | | | |
| | $d_5 = 4.5000$ | $n_3 = 1.53358$ | $\nu_3 = 51.56$ |
| $r_6 = -712.6568$ | | | |
| | $d_6 = l_1$ | | |
| $r_7 = -90.3467$ | | | |
| | $d_7 = 1.3000$ | $n_4 = 1.77250$ | $\nu_4 = 49.66$ |
| $r_8 = 14.7553$ | | | |
| | $d_8 = 0.6550$ | | |
| $r_9 = 15.6373$ | | | |

|  |  |  |  |
|---|---|---|---|
| $r_{10} = 69.0344$ | $d_9 = 2.8500$ | $n_5 = 1.80518$ | $\nu_5 = 25.43$ |
| $r_{11} = -67.4350$ | $d_{10} = 1.4101$ |  |  |
| $r_{12} = 164.8495$ | $d_{11} = 1.3000$ | $n_6 = 1.72916$ | $\nu_6 = 54.68$ |
| $r_{13} = \infty$ (stop) | $d_{12} = l_2$ |  |  |
| $r_{14} = -490.4177$ | $d_{13} = 1.9126$ |  |  |
| $r_{15} = -27.8080$ | $d_{14} = 2.5985$ | $n_7 = 1.63930$ | $\nu_7 = 44.68$ |
| $r_{16} = 18.8801$ | $d_{15} = 0.1624$ |  |  |
| $r_{17} = -57.4396$ | $d_{16} = 3.3420$ | $n_8 = 1.56873$ | $\nu_8 = 63.16$ |
| $r_{18} = -24.3014$ | $d_{17} = 1.1500$ |  |  |
| $r_{19} = 32.9383$ | $d_{18} = 1.6178$ | $n_9 = 1.80518$ | $\nu_9 = 25.43$ |
| $r_{20} = 381.4716$ | $d_{19} = 2.3623$ |  |  |
| $r_{21} = -18.6397$ | $d_{20} = 3.2322$ | $n_{10} = 1.56444$ | $\nu_{10} = 43.78$ |
| $r_{22} = -55.1813$ | $d_{21} = l_3$ |  |  |
| $r_{23} = -22.3069$ | $d_{22} = 3.6500$ | $n_{11} = 1.78470$ | $\nu_{11} = 26.30$ |
| $r_{24} = -18.0126$ | $d_{23} = 2.6559$ |  |  |
| $r_{25} = 421.6795$ | $d_{24} = 1.6014$ | $n_{12} = 1.79500$ | $\nu_{12} = 45.29$ |

|  | $l_1$ | $l_2$ | $l_3$ |
|---|---|---|---|
| (W) | 1.901 | 12.304 | 19.528 |
| (S) | 7.433 | 6.773 | 10.884 |
| (T) | 11.404 | 2.801 | 2.394 |

$$\frac{\phi_{123}}{\phi_W} = 1.2405, \quad \beta_{2T} \cdot \beta_{3T} = 0.7322$$

$$\frac{\beta_{4T}}{\beta_{4W}} = 1.839$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective embodiments.

17. A compact high vari-focal ratio zoom lens system according to claim 10 having the following numerical data:

| f = 39.946~102.429, F/4.66~6.38 |  |  |  |
|---|---|---|---|
| 2ω = 56.877°~23.851° |  |  |  |
| $r_1 = 348.9483$ |  |  |  |
|  | $d_1 = 1.5000$ | $n_1 = 1.84666$ | $\nu_1 = 23.88$ |
| $r_2 = 48.5588$ |  |  |  |
|  | $d_2 = 0.8800$ |  |  |
| $r_3 = 167.0763$ |  |  |  |
| $r_4 = -189.4483$ | $d_3 = 3.5700$ | $n_2 = 1.68680$ | $\nu_2 = 55.52$ |
|  | $d_4 = 0.2000$ |  |  |
| $r_5 = 29.5620$ | $d_5 = 4.5000$ | $n_3 = 1.53358$ | $\nu_3 = 51.56$ |
| $r_6 = -170.1935$ | $d_6 = l_1$ |  |  |
| $r_7 = -51.6606$ | $d_7 = 1.3000$ | $n_4 = 1.77250$ | $\nu_4 = 49.66$ |
| $r_8 = 18.5047$ | $d_8 = 2.8500$ | $n_5 = 1.80518$ | $\nu_5 = 25.43$ |
| $r_9 = 159.0754$ | $d_9 = 1.9000$ |  |  |
| $r_{10} = -50.8129$ | $d_{10} = 1.3000$ | $n_6 = 1.72916$ | $\nu_6 = 54.68$ |
| $r_{11} = 642.0467$ | $d_{11} = l_2$ |  |  |
| $r_{12} = \infty$ (stop) | $d_{12} = 1.9126$ |  |  |
| $r_{13} = 163.0487$ | $d_{13} = 2.5985$ | $n_7 = 1.63930$ | $\nu_7 = 44.58$ |
| $r_{14} = -28.6154$ | $d_{14} = 0.1624$ |  |  |
| $r_{15} = 20.1618$ | $d_{15} = 3.4320$ | $n_8 = 1.56873$ | $\nu_8 = 63.16$ |
| $r_{16} = -77.5756$ | $d_{16} = 1.1500$ |  |  |
| $r_{17} = -24.5784$ | $d_{17} = 1.6178$ | $n_9 = 1.80518$ | $\nu_9 = 25.43$ |
| $r_{18} = 37.0934$ | $d_{18} = 2.3623$ |  |  |
| $r_{19} = 1004.5794$ | $d_{19} = 3.2322$ | $n_{10} = 1.56444$ | $\nu_{10} = 43.78$ |
| $r_{20} = -18.5727$ | $d_{20} = l_3$ |  |  |
| $r_{21} = -45.8923$ | $d_{21} = 3.6500$ (aspherical surface) | $n_{11} = 1.78470$ | $\nu_{11} = 26.30$ |
| $r_{22} = -20.3180$ | $d_{22} = 2.6559$ |  |  |
| $r_{23} = -16.0969$ | $d_{23} = 1.6014$ | $n_{12} = 1.78590$ | $\nu_{12} = 44.18$ |
| $r_{24} = 421.4819$ |  |  |  |

| aspherical surface coefficients |
|---|
| $A_{22} = -0.75814 \times 10^{-6}$ |
| $B_{22} = -0.3655 \times 10^{-7}$ |
| $C_{22} = 0.35896 \times 10^{-9}$ |
| $D_{22} = -0.16527 \times 10^{-11}$ |

|  | $l_1$ | $l_2$ | $l_3$ |
|---|---|---|---|
| (W) | 2.256 | 11.539 | 17.353 |
| (S) | 6.806 | 6.989 | 9.944 |
| (T) | 10.995 | 2.8 | 3.935 |

$$\frac{\phi_{123}}{\phi_W} = 1.305, \quad \beta_{2T} \cdot \beta_{3T} = 0.6765$$

$$\frac{\beta_{4T}}{\beta_{4W}} = 1.888$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective embodiments.

* * * * *